United States Patent
Lewis et al.

(10) Patent No.: US 9,955,159 B2
(45) Date of Patent: Apr. 24, 2018

(54) MULTI-VIDEO DECODING WITH INPUT SWITCHING

(71) Applicant: Google Inc., Mountain View, CA (US)

(72) Inventors: Andrew Benedict Lewis, London (GB); Richard Zarek Cohen, London (GB)

(73) Assignee: Google LLC, Mountain View, CA (US)

( * ) Notice: Subject to any disclaimer, the term of this patent is extended or adjusted under 35 U.S.C. 154(b) by 516 days.

(21) Appl. No.: 14/529,245

(22) Filed: Oct. 31, 2014

(65) Prior Publication Data

US 2016/0127709 A1    May 5, 2016

(51) Int. Cl.
| | |
|---|---|
| *H04N 5/917* | (2006.01) |
| *H04N 19/114* | (2014.01) |
| *H04N 19/172* | (2014.01) |
| *H04N 19/597* | (2014.01) |
| *H04N 19/176* | (2014.01) |
| *H04N 19/107* | (2014.01) |
| *H04N 19/157* | (2014.01) |

(Continued)

(52) U.S. Cl.
CPC ......... *H04N 19/114* (2014.11); *H04N 19/107* (2014.11); *H04N 19/157* (2014.11); *H04N 19/172* (2014.11); *H04N 19/176* (2014.11); *H04N 19/40* (2014.11); *H04N 19/597* (2014.11); *H04N 21/47202* (2013.01); *H04N 21/47217* (2013.01)

(58) Field of Classification Search
None
See application file for complete search history.

(56) References Cited

U.S. PATENT DOCUMENTS

| | | |
|---|---|---|
| 5,691,768 A | 11/1997 | Civanlar et al. |
| 6,345,122 B1 | 2/2002 | Yamato et al. |
| 8,374,249 B2 | 2/2013 | Suh et al. |

(Continued)

OTHER PUBLICATIONS

Lei et al., "Video Bridging Based on H.261 Standard," IEEE Transactions on Circuits and Systems for Video Technology, vol. 4, No. 4, Aug. 1, 1994, pp. 425-436.

(Continued)

*Primary Examiner* — Heather Jones
(74) *Attorney, Agent, or Firm* — McDonnell Boehnen Hulbert & Berghoff LLP

(57) ABSTRACT

In some aspects, methods and systems described herein provide for preparing component videos for combining into a bitstream. An example system may receive a source video. The system may also receive data representing a compression format. The system may encode a reference frame as an intra-coded picture that is sub-divided into intra-coded units. The system may encode the sequence of source frames as a sequence of predictive-coded pictures conforming to the compression format. The sequence may be divided into groups of pictures that include a first predictive-coded picture followed by one or more second predictive-coded pictures. The first predictive-coded picture may be sub-divided into intra-coded units that represent respective portions of a source frame by describing the pixels of the portion so as to simulate intra-coded pictures. The system may concatenate the sequence of predictive-coded pictures after the intra-coded picture so as to produce a bitstream.

12 Claims, 12 Drawing Sheets

(51) Int. Cl.
*H04N 19/40* (2014.01)
*H04N 21/472* (2011.01)

(56) References Cited

U.S. PATENT DOCUMENTS

| | | | |
|---|---|---|---|
| 8,538,197 | B2 | 9/2013 | Kobayashi et al. |
| 2004/0022202 | A1* | 2/2004 | Yang ................... H04L 12/1813 370/261 |
| 2008/0170622 | A1 | 7/2008 | Gordon et al. |
| 2009/0300676 | A1 | 12/2009 | Harter, Jr. |
| 2011/0058607 | A1 | 3/2011 | Zhao |
| 2011/0286530 | A1 | 11/2011 | Tian et al. |
| 2013/0022104 | A1* | 1/2013 | Chen ...................... H04N 19/70 375/240.02 |
| 2014/0108605 | A1 | 4/2014 | Wang et al. |
| 2014/0192893 | A1* | 7/2014 | Sullivan ........... H04N 21/23424 375/240.25 |

OTHER PUBLICATIONS

International Search Report and Written Opinion prepared by the European Patent Office in application No. PCT/US2015/057353 dated Jan. 28, 2016.
International Preliminary Report on Patentability and Written Opinion prepared by the International Bureau of WIPO in application No. PCT/US2015/057353 dated May 11, 2017.

* cited by examiner

| | | | |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |
| 32 | 33 | 34 | 35 |
| 36 | 37 | 38 | 39 |
| 40 | 41 | 42 | 43 |
| 44 | 45 | 46 | 47 |
| 48 | 49 | 50 | 51 |
| 52 | 53 | 54 | 55 |
| 56 | 57 | 58 | 59 |
| 60 | 61 | 62 | 63 |

P-FRAME 1202 (rows 0–15)
P-FRAME 1204 (rows 16–31)
P-FRAME 1206 (rows 32–47)
P-FRAME 1208 (rows 48–63)
FRAME 1200

FIG. 12

MULTI-VIDEO DECODING WITH INPUT SWITCHING

BACKGROUND

Unless otherwise indicated herein, the materials described in this section are not prior art to the claims in this application and are not admitted to be prior art by inclusion in this section.

Media, such as video and audio, is often compressed to reduce the quantity of data needed to represent the media (commonly known as the bit rate). By reducing the bit rate, a smaller amount of data storage may be needed to store the video and less bandwidth may be needed to transmit the video over a network. Numerous video codecs (coder/decoders) exist as hardware and/or software components that enable compression or decompression of digital video. To decode compressed video, many types of computing systems have hardware and/or software decoding units.

Decoding video can be a CPU-intensive task, especially for higher resolutions like 1080p. Therefore, while video decoders may be implemented as software modules that execute on general purpose processors, in many circumstances, specialized hardware decoders may be more efficient and/or more capable, especially with regards to decoding higher-resolution video. Some low-power devices, such mobile computing systems, may be equipped with general purpose processors that may have difficulty decoding high-resolution video in real-time and/or within an acceptable power envelope. To assist in decoding such videos, some mobile computing systems, such as smartphones and tablets, may be equipped with one or more hardware video decoders configured to decode compressed video.

BRIEF SUMMARY

In one example, a method is provided that may involve receiving a source video comprising a sequence of source frames. The source frames may include respective pixels. The method may further involve receiving data representing a compression format for encoding the source video. The compression format may defines at least two types of pictures including intra-coded pictures which represent respective source frames by describing the pixels of the source frame and predictive-coded pictures which represent respective source frames by describing differences between the pixels of the source frame and the pixels of one or more preceding frames. The method may also involve encoding a reference frame as an intra-coded picture that is sub-divided into intra-coded units that represent respective portions of the reference frame by describing the pixels of the portion. The method may involve encoding the sequence of source frames as a sequence of predictive-coded pictures conforming to the compression format. The sequence may be divided into groups of pictures that include a first predictive-coded picture followed by one or more second predictive-coded pictures. The first predictive-coded picture may be sub-divided into intra-coded units that represent respective portions of a source frame by describing the pixels of the portion so as to simulate intra-coded pictures. The method may further involve concatenating the sequence of predictive-coded pictures after the intra-coded picture so as to produce a bitstream including the intra-coded picture followed by the sequence of predictive-coded pictures.

In another example, a computing system is provided that includes one or more processors and data storage configured to store instructions, that when executed by the one or more processors, cause the computing system to perform operations. The operations may include receiving a source video comprising a sequence of source frames. The source frames may include respective pixels. The operations may also include receiving data representing a compression format for encoding the source video. The compression format may defines at least two types of pictures including intra-coded pictures which represent respective source frames by describing the pixels of the source frame and predictive-coded pictures which represent respective source frames by describing differences between the pixels of the source frame and the pixels of one or more preceding source frames in a sequence. The operations may also include encoding source frames that are designated by the compression format to be encoded as intra-coded pictures as respective first predictive-coded pictures that are sub-divided into intra-coded units so as to simulate intra-coded pictures. Such intra-coded units may represent respective portions of a source frame by describing the pixels of the portion. The operations may also include encoding source frames that are designated by the compression format to be encoded as predictive-coded pictures as respective second predictive-coded pictures. The operations may further include concatenating the first predictive-coded pictures and the second predictive-coded pictures into a sequence of predictive-coded pictures representing the source video.

In another example, a computer readable storage memory is provided that has stored therein instructions, that when executed by a processor, cause the processor to perform functions. The functions may include receiving a source video comprising a sequence of source frames. The source frames may include respective pixels. The functions may also include receiving data representing a compression format for encoding the source video. The compression format may defines at least two types of pictures including intra-coded pictures which represent respective source frames by describing the pixels of the source frame and predictive-coded pictures which represent respective source frames by describing differences between the pixels of the source frame and the pixels of one or more preceding source frames in a sequence. The functions may also include encoding source frames that are designated by the compression format to be encoded as intra-coded pictures as respective first predictive-coded pictures that are sub-divided into intra-coded units so as to simulate intra-coded pictures. Such intra-coded units may represent respective portions of a source frame by describing the pixels of the portion. The functions may also include encoding source frames that are designated by the compression format to be encoded as predictive-coded pictures as respective second predictive-coded pictures. The functions may further include concatenating the first predictive-coded pictures and the second predictive-coded pictures into a sequence of predictive-coded pictures representing the source video.

In yet another example, a system is provided that includes a means-for receiving a source video comprising a sequence of source frames. The source frames may include respective pixels. The system may also include a means-for receiving data representing a compression format for encoding the source video. The compression format may defines at least two types of pictures including intra-coded pictures which represent respective source frames by describing the pixels of the source frame and predictive-coded pictures which represent respective source frames by describing differences between the pixels of the source frame and the pixels of one or more preceding source frames in a sequence. The system may also include a means-for encoding source frames that are designated by the compression format to be encoded as intra-coded pictures as respective first predictive-coded pictures that are sub-divided into intra-coded units so as to simulate intra-coded pictures. Such intra-coded units may represent respective portions of a source frame by describing the pixels of the portion. The system may also include a means-for encoding source frames that are designated by the compression format to be encoded as predictive-coded pictures as respective second predictive-coded pictures The system may also include a means-for concatenating the first predictive-coded pictures and the second predictive-coded pictures into a sequence of predictive-coded pictures representing the source video.

In still another example, a method is provided that involves receiving a first bitstream that includes a first setoff and a first sequence of frames that represents a first video. The first setoff may include an intra-coded frame followed by an offset of predictive-coded frames. The first sequence of frames may be divided into groups of frames that include a first predictive-coded frame followed by one or more second predictive-coded frames. The first predictive-coded frames may be sub-divided into intra-coded units to simulate intra-coded frames. The method may also involve receiving a second bitstream that includes a second setoff comprising of an intra-coded frame and a second sequence of frames that represents a second video. The second sequence of frames may be divided into groups of frames that include a third predictive-coded frame followed by one or more fourth predictive-coded frames. The third predictive-coded frames may be sub-divided into intra-coded units to simulate intra-coded frames. The method may involve combining the intra-coded frame of the first setoff with the intra-coded frame of the second setoff as a first output frame in a bitstream of output frames. The method may also involve combining one or more of the predictive-coded frames of the first setoff with respective predictive-coded frames of the second sequence of frames as second output frames that follow the first output frame in the bitstream of output frames such that the one or more predictive-coded frames of the first setoff delay the first sequence of frames relative to the second sequence of frames within the bitstream. The method may further involve combining the predictive-coded frames of the first sequence of frames with respective predictive-coded frames of the second sequence of frames as third output frames that follow the second output frames in the bitstream of output frames and sending the bitstream of output frames to a decoder.

In still another example, a device is provided that comprises one or more processors and data storage configured to store instructions, that when executed by the one or more processors, cause the device to perform operations. The operations may include receiving a first bitstream that includes a first setoff and a first sequence of frames that represents a first video. The first setoff may include an intra-coded frame followed by an offset of predictive-coded frames. The first sequence of frames may be divided into groups of frames that include a first predictive-coded frame followed by one or more second predictive-coded frames. The first predictive-coded frames may be sub-divided into intra-coded units to simulate intra-coded frames. The operations may also include receiving a second bitstream that includes a second setoff comprising of an intra-coded frame and a second sequence of frames that represents a second video. The second sequence of frames may be divided into groups of frames that include a third predictive-coded frame followed by one or more fourth predictive-coded frames. The third predictive-coded frames may be sub-divided into intra-coded units to simulate intra-coded frames. The operations may include combining the intra-coded frame of the first setoff with the intra-coded frame of the second setoff as a first output frame in a bitstream of output frames. The operations may also include combining one or more of the predictive-coded frames of the first setoff with respective predictive-coded frames of the second sequence of frames as second output frames that follow the first output frame in the bitstream of output frames such that the one or more predictive-coded frames of the first setoff delay the first sequence of frames relative to the second sequence of frames within the bitstream. The operations may further include combining the predictive-coded frames of the first sequence of frames with respective predictive-coded frames of the second sequence of frames as third output frames that follow the second output frames in the bitstream of output frames and sending the bitstream of output frames to a decoder.

In yet another example, a system is provided that includes a means for receiving a first bitstream that includes a first setoff and a first sequence of frames that represents a first video. The first setoff may include an intra-coded frame followed by an offset of predictive-coded frames. The first sequence of frames may be divided into groups of frames that include a first predictive-coded frame followed by one or more second predictive-coded frames. The first predictive-coded frames may be sub-divided into intra-coded units to simulate intra-coded frames. The system may also include a means-for receiving a second bitstream that includes a second setoff comprising of an intra-coded frame and a second sequence of frames that represents a second video. The second sequence of frames may be divided into groups of frames that include a third predictive-coded frame followed by one or more fourth predictive-coded frames. The third predictive-coded frames may be sub-divided into intra-coded units to simulate intra-coded frames. The system may also include a means-for combining the intra-coded frame of the first setoff with the intra-coded frame of the second setoff as a first output frame in a bitstream of output frames. The system may also include a means-for combining one or more of the predictive-coded frames of the first setoff with respective predictive-coded frames of the second sequence of frames as second output frames that follow the first output frame in the bitstream of output frames such that the one or more predictive-coded frames of the first setoff delay the first sequence of frames relative to the second sequence of frames within the bitstream. The system may also include a means-for combining the predictive-coded frames of the first sequence of frames with respective predictive-coded frames of the second sequence of frames as third output frames that follow the second output frames in the bitstream of output frames and a means-for sending the bitstream of output frames to a decoder.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 12 illustrates an example frame of another combined video bitstream.

DETAILED DESCRIPTION

Figure 1:
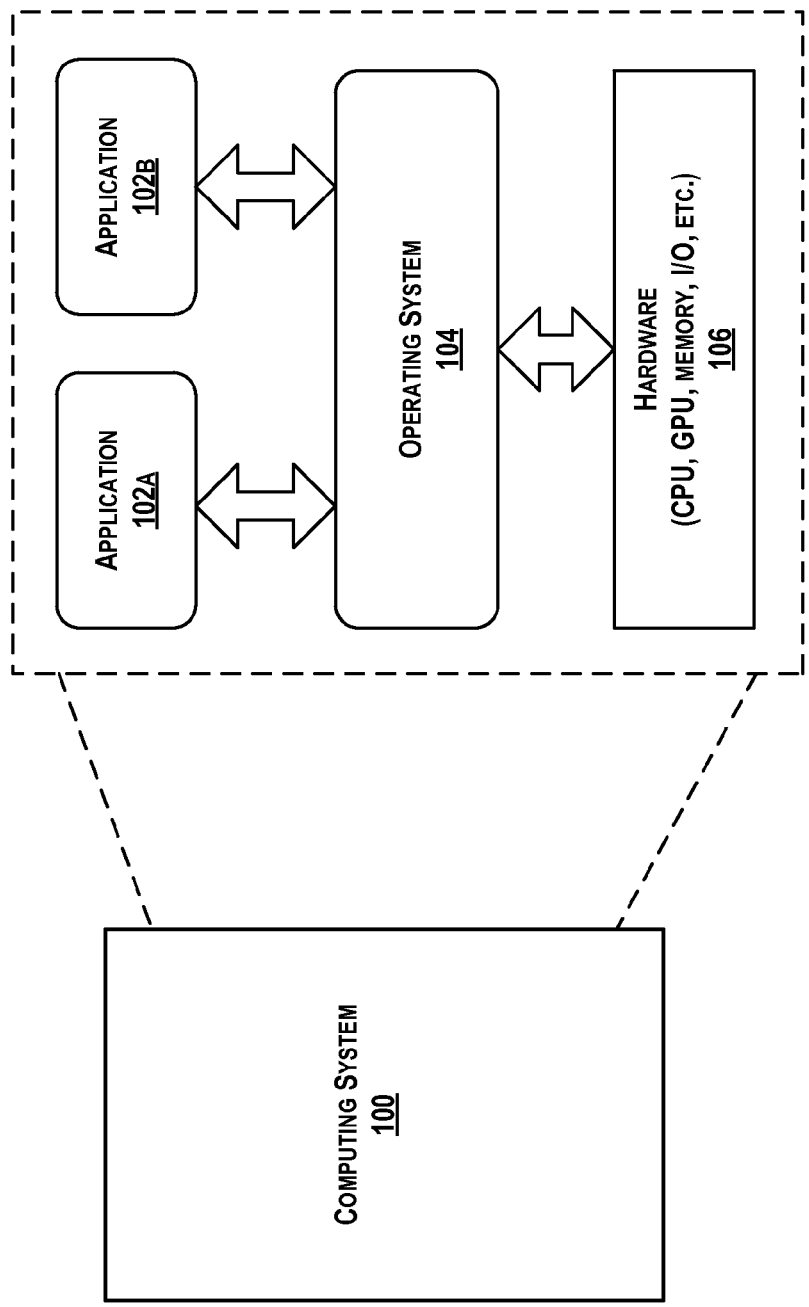
FIG. 1 illustrates an example computing system by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A given computing system may have a video decoder that assists the computing system in decoding encoded videos. In some cases, the video decoder may be implemented within the computing system as specialized hardware configured to execute specific code algorithms which function to decode video. The specialized hardware may support decoding a certain number of video streams concurrently. For instance, the specialized hardware may include a total of two hardware decoder units, each of which may support decoding one video at a time.

At the same time, some applications may provide for displaying more videos concurrently than the specialized hardware can decode concurrently. For example, a video chat application that supports group chat with multiple computing systems concurrently may provide for concurrent display a video stream from each computing system. As another example, a news feed application may provide for display of a preview video next to each news item in a news feed of multiple news items. Further, a multi-view video application may provide for display of a scene from multiple viewpoints in respective videos. Many multiple video applications are possible.

When an application provides for the concurrent display of more video streams than a given computing system supports decoding in hardware, the computing system may decode one or more of the video streams using a software decoder. However, decoding in software on a general purpose processor is not typically as efficient as decoding on a hardware decoder. In some cases, the general purpose processor on which the software decoder is executing may not be fast enough to decode the one or more video streams in real-time. Also, in some cases, decoding in software may significantly increase the processor utilization, which may negatively affect the user experience in various ways, such as by causing the UI to feel sluggish or unresponsive. In some cases, decoding a video in software may also use relatively more battery charge than used by decoding the video using specialized hardware. As an alternative to decoding with a software decoder, manufacturers may include additional decoding units in their computing systems. However, this solution may increase the cost and power consumption of the computing systems.

According to various techniques, multiple compressed videos may be combined into a single video that can be decoded by a single decoder so as to provide multiple videos for concurrent display. For instance, a processor may receive two or more bitstreams that each represent an encoded video. The processor may then combine the two or more bitstreams into an output bitstream that represents frames having content from each of the two or more bitstreams. The processor may then provide the output bitstream as input to a video decoder, which may provide decoded frames that include content from each of the two or more video streams. The processor may then divide the outputted frames into their component videos.

Hardware video decoders that are included in computing systems typically support several compression formats. Videos can be then encoded into one of these compression formats with the expectation that decoders supporting the compression format will be able to decode the compressed video. Various challenges arise when combining component bitstreams representing respective videos into an output bitstream that is decodable by a standard decoder.

One challenge is the arrangement of different picture types (also known as frame types) within the output bitstream. Three example picture types are generally used in the field of video compression. Intra-coded pictures (also known as I-frames) represent a source frame by representing the pixels of the source frame. In other words, I-frames can fully specify content of a source frame. Predictive-coded pictures (P-frames) represent a source frame by describing differences between the source frame and one or more preceding frames. By describing the differences between the sources frames, a P-frame may use less data to represent a source frame than an I-frame. A third type of frame is known as a bi-predictive picture (B-frames). B-frames may use even less data to represent a source frame than an P-frame by describing the differences between a source frame and both one or more preceding frames and one or more succeeding frames. Combining frames of different types in a single output frame can make the frame undecodable by standard decoders, perhaps because such decoders might not be able to interpret the structure of such an output frame.

In some example compression formats, pictures (i.e., I-, P-, and B-frames) may be sub-divided into units which can be coded according to the different types of coding. Examples of such units include macroblocks and coding tree units, among other examples. According to such example compression formats, I-frames may include intra-coded units, P-frames may include either intra-coded units or predictive-coded units, and B-frames may include intra-coded units, predictive-coded units, or bi-predictive units, which code portions of source frames using similar schemes as described above for coding source frames by way of I-, P-, and B-frames.

Since combining frames of different types may render the frame undecodable by standard decoders, techniques for combining component bitstreams into an output bitstream use various approaches to avoid combining frames of different types in a single output frame. Some approaches involve encoding the source video using only P-frames. One possible drawback of such an approach is that the encoded video may need to be played back in sequence from the beginning without skipping forward or backward, as decoding of each P-frame in the sequence depends upon the decoding of one or more preceding frames. Another example approach involves aligning the frames of the component videos such that frames of the same type are combined into output frames. This approach may impose various restraints on the component videos. For instance, the component videos may be limited to videos having the same key-frame interval (i.e., the interval at which I-frames appear in the bitstream) so that frames of the same type may be aligned.

In one aspect, example techniques described herein provide for preparing source videos for combination. Preparing source videos using the disclosed techniques may have various advantages, such as permitting the combination of more varied bitstreams and perhaps also permitting more flexibility in decoding. An example technique may involve encoding a source video into a sequence of P-frames so as to have a bitstream of frames of the same type. Within the sequence of P-frames, certain P-frames may be encoded to simulate an I-frame by including only intra-coded units. In some examples, the encoder may substitute such simulated I-frames for I-frames that would have appeared in the bitstream (e.g., at every nth frame according to a key-frame interval or perhaps at a source frame at which a scene change occurred in the source video). Such an encoding scheme may yield a bitstream that appears to a decoder as a bitstream that includes only predictive-coded pictures, but may function as a bitstream that includes both intra-coded pictures and predictive-coded pictures.

In another aspect, example systems and methods are described herein that provide for combining videos that have been prepared according to the techniques noted above. Combining such bitstreams may involve combining predictive-coded pictures of a first bitstream with predictive-coded pictures that simulate I-frames so as to have effectively combined frames of different types. Such example systems and methods may have various example advantages, such as allowing the combination of component videos having different key-frame intervals, allowing playback of component videos to start at different times, and allowing a decoder to initiate decoding at multiple points within the bitstream, as perhaps might occur when skipping forward or backward within the video during playback.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

Referring now to the figures, FIG. 1 illustrates an example computing system 100 by which example methods may be implemented. Computing system 100 may include applications 102A and 102B and an operating system 104 being executed by hardware 106. The example computing system 100 may be implemented as a PC, a laptop, a smartphones, a tablet computer, a server, a server cluster, or any other suitable computing system. As noted above, operations disclosed herein may be divided among more than one computing system or system. As will be understood by one having skill in the art, while many example computing systems may have suitable hardware and software to implement the example operations described here, different types of computing systems may include hardware or software that performs the operations more or less efficiently. For example, while an example smartphone may include a software encoder that may be used to prepare component bitstreams, an example server or server cluster may have one or more specialized hardware encoders that can encode component bitstreams more efficiently.

In an example commercial embodiment, one or more first computing systems (e.g., one or more servers) may prepare source videos into component bitstreams, as such servers may be equipped with hardware suited for computationally-intensive tasks such as encoding. A second computing system (e.g., a smartphone, PCs, laptop, or tablet computer may combine the component bitstreams and decode the combined bitstream for display. Alternatively, one or more first computing systems may encode source videos into component bitstreams, a second computing system may combine the component bitstreams, and a third computing system may decode the combined bitstream. Other arrangements are possible as well.

Each of the applications 102A and 102B may include instructions that when executed cause the computing system 100 to perform specific tasks or functions. Applications 102A and 102B may be native applications (i.e., installed by a manufacturer of the computing system 100 and/or a manufacturer of the operating system 104) or may be a third-party application installed by a user of the computing system 100 after purchasing the computing system. A non-exhaustive list of example applications includes: a video encoding or transcoding application; a media player application that accepts media files as inputs and generates corresponding video and/or audio to the output device(s); a video gallery application; a video communication application (e.g., a video chat or video call application); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 104 may interact with and manage hardware 106 to provide services for the applications 102A and 102B. For example, an application 102A may request that the operating system 104 direct an encoder or decoder of hardware 106 to encode or decode a bitstream.

The hardware 106 may include, for example, a central processing unit (CPU), a graphics processor (GPU), memory, an input/output (I/O) interface, user input device(s), and output device(s). Components of hardware 106 may be controlled by instructions contained in applications 102A and 102B and operating system 104.

The central processing unit (CPU) may be operable to effectuate the operation of the computing system 100 by executing instructions stored in memory or disk storage. Such instructions may include the operating system 104 and the applications 102A and 102B. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 104 and the applications 102A and 102B. Runtime memory may store data generated or used during execution of the operating system 104 or applications 102A and 102B.

The input/output (I/O) interface may be operable to receive signals from the input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing system 100.

The output devices may include, for example, a screen and speakers. The screen may be, for example, a liquid crystal display (LCD) screen, an OLED screen, an e-ink screen, and/or any other suitable device for presenting a graphical user interface.

Figure 2:
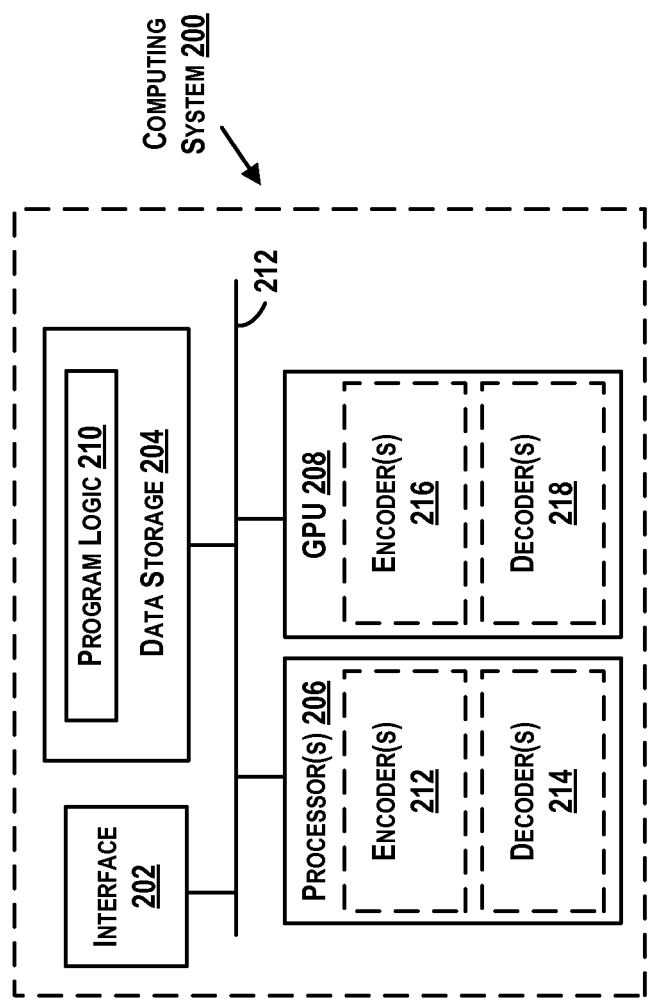
FIG. 2 illustrates example components of an example computing system.

FIG. 2 illustrates example components of an example computing system, such as the example computing system 100 in FIG. 1, among other examples. In some examples, some components illustrated in FIG. 2 may be distributed across multiple computing systems. However, for the sake of example, the components are shown and described as part of one example computing system 200. The computing system 200 may be or include a mobile device, desktop computer, laptop computer, server, server cluster, email/messaging device, tablet computer, or similar device or system that may be configured to perform the operations described herein.

In some implementations, the computing system 200 may include a device platform (not shown), which may be configured as a multi-layered Linux platform, or, alternatively, any suitable platform. The device platform may include different applications and an application framework, as well as various kernels, libraries, and runtime entities. In other examples, other formats or systems may operate the computing system 200 as well.

The computing system 200 may include an interface 202, data storage 204, and one or more processor(s) 206. Components illustrated in FIG. 2 may be linked together by a communication link 210. The computing system 200 may also include hardware to enable communication within the computing system 200 and between the computing system 200 and another computing system (not shown), such as a server entity. The hardware may include transmitters, receivers, and antennas, for example.

The interface 202 may be configured to allow the computing system 200 to communicate with another computing system (not shown), such as a server, laptop, tablet computer, or smartphone. Thus, the interface 202 may be configured to receive input data from one or more computing systems, and may also be configured to send output data to the one or more computing systems.

The interface 202 may include a wired communication component that is configured to facilitate wired data communication for the computing system 200 according to one or more wired communication standards. For example, the wired communication component may include an Ethernet communication component that is configured to facilitate wireless data communication according to one or more IEEE 802.3 standards. Other examples are also possible, such as a fiber-optic communication component.

The interface 202 may include a wireless communication interface that is configured to facilitate wireless data communication for the system 200 according to one or more wireless communication standards. For example, the wireless communication component may include a Wi-Fi communication component that is configured to facilitate wireless data communication according to one or more IEEE 802.11 standards. As another example, the wireless communication component may include a Bluetooth communication component that is configured to facilitate wireless data communication according to one or more Bluetooth standards. Other examples are also possible.

The interface 202 may include a cellular communication interface that is configured to facilitate wireless data communication according to one or one cellular radio standards. For example, the cellular radio component may include a cellular radio that is configured to facilitate wireless data communication according to one or more cellular standards, such as the Global System for Mobile Communications (GSM), Code Division Multiple Access, Long-Term Evolution (LTE), Worldwide Interoperability for Microwave Access (WiMax), among others.

In other examples, the interface 202 may also include a user-interface, such as a keyboard, microphone, touchscreen, etc., to receive inputs as well.

The data storage 204 may store program logic 212 (instructions) that can be accessed and executed by the one or more processors 206. The data storage 204 may also store data 214 that may include data received by the interface 202. For instance, the data storage 204 may store one or more bitstreams that represent video which were received by way of interface 202.

The one or more processors 206 may be a general purpose processor that may access program logic 212 that can be retrieved and executed by the one or more processors 206. The one or more processors 206 may include one or more encoder(s) 216 that may be configured to encode raw (i.e., uncompressed) source video. Such encoders may also be configured to transcode encoded video between compression formats. A non-exhaustive list of example video compression formats that may be processed by the one or more encoder(s) 222A include MPEG (e.g., H.264/MPEG-4 AVC and H.265/MPEG-H HEVC), Windows Media Video (WMV), On2 (e.g., VP8 and VP9), Sorenson, Dirac, Cinepak, and RealVideo. The one or more processors 206 may also include one or more decoder(s) 218 that may be configured to decode encoded video, such as video encoded in the example video compression formats listed above.

The computing system 200 is illustrated to include a graphics processing unit (GPU) 208. The GPU 208 may be configured to control other aspects of the computing system 200 including displays or outputs of the computing system 200. The GPU 208 may include one or more encoders 220 that may be configured to encode or transcode video. The GPU 208 may also include one or more decoder(s) 222 that may be configured to decode video that has been compressed using one or more of the above-referenced video codecs, among other examples.

The communication link 210 is illustrated as a wired connection; however, wireless connections may also be used. For example, the communication link 210 may be a point-to-point interconnect or system bus, a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

Example methods described herein may be performed individually by components of the computing system 200, or in combination by one or all of the components of the computing system 200. In one instance, portions of the computing system 200 may process data and provide an output internally in the computing system 200 to the one or more processors 206, for example. In other instances, portions of the computing system 200 may process data and provide outputs externally to other computing systems, perhaps by way of the interface 202.

Figure 3:
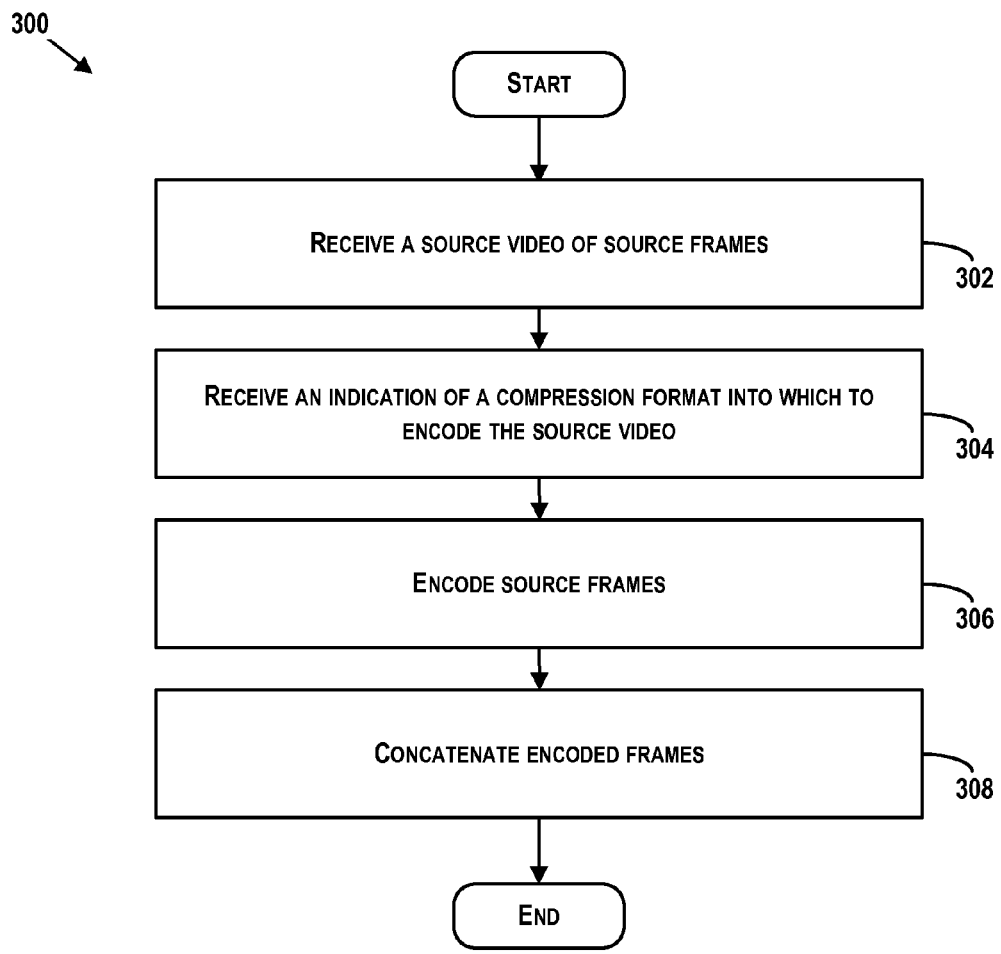
FIG. 3 is a flowchart illustrating an example method to facilitate preparing component videos for combining into a bitstream.

FIG. 3 is a block diagram of an example method 300 to facilitate preparing component videos for combining into a bitstream, in accordance with at least some embodiments described herein. Method 300 shown in FIG. 3 presents an embodiment of a method that, for example, could be used with a computing system, such as computing system 100 in FIG. 1 or computing system 200 in FIG. 2, among other examples. Method 300 may include one or more operations, functions, or actions as illustrated by one or more blocks of 302-308. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 300 and other processes and methods disclosed herein, each block in FIG. 3 may represent circuitry that is wired to perform the specific logical functions in the process.

Functions of the method 300 may be fully performed by a processor of a computing system, or may be distributed across multiple components of a computing system. In some examples, the functions of method 300 may be distributed across multiple computing systems and/or a server.

At block 302, the method 300 involves a computing system receiving a source video. For instance, computing system 200 may receive a source video by way of interface 202, perhaps from another computing system (e.g., a computing system that includes a data storage having one or more source videos stored therein). Alternatively, one or more processors 206 may receive a source video from data storage 204 by way of communication link 210. Other examples are possible as well.

The source video may include a sequence of source frames. The source frames may include respective pixels that represent respective still images. The computing system may receive the source video as a bitstream or as a data file, among other examples. In some cases, the source video may be in a raw (i.e., uncompressed) data format. In such cases, the source frames might be sequenced in display order. In other cases, the source video may be in a compressed data format such as MPEG-2 Part 2, MPEG-4 Part 2, H.264 (MPEG-4 Part 10), HEVC, Theora, Dirac, RealVideo RV40, VP8, and VP9. In these cases, the source frames might be sequenced in decoding order, which might differ from the display order (or perhaps be the same ordering as the display order, depending on the technique used in encoding the source video).

At block 304, the method involves a computing system receiving an indication of a compression format for encoding the received source video. For instance, computing system 200 may receive data representing a compression format by way of interface 202, perhaps from another computing system. Alternatively, one or more processors 206 may receive data representing a compression format from data storage 204 by way of communication link 210. In some cases, the compression format may be specified by a video encoding or transcoding application (e.g., applications 102A and 102B).

A compression format may specify certain parameters and structures with which to code the source video so that the video may be decodable by decoders that support decoding the particular compression format. As one example, the source video may be encoded into the H.264/MPEG-4 AVC (H.264) compression format. A properly-encoded H.264 bitstream contains sufficient information for a decoder that supports decoding H.264-encoded videos to decode the encoded frames of the bitstream.

In one aspect, the compression format may define one or more picture types (also known as frame types) that are supported by the compression format. An encoder may encode source frames into one of the picture types supported by the compression format. As noted above, the three major picture types that are used in the field of video compression include intra-coded pictures (I-frames), predictive-coded pictures (P-frames), and bi-predictive pictures (B-frames). Some compression formats may support other types of pictures. Intra-coded pictures represent respective source frames by describing the pixels of the source frame. Predictive-coded pictures represent respective source frames by describing differences between the pixels of the source frame and the pixels of one or more preceding source frames in a sequence. Bi-predictive pictures represent respective source frames by describing differences between the pixels of the source frame and the pixels of one or more preceding source frames and the pixels of one or more succeeding source frames in a sequence In some compression formats, frames may be divided into parts, which may allow for greater granularity in the establishment of prediction types. For instance, under H.264, an encoder may encode a source frame into one or more parts referred to as "slices." In H.264, a slice is a spatially-distinct region of a frame that is encoded separately from other regions (slices) in the frame. Accordingly, in H.264, instead of I-frames, P-frames, and B-frames, there are I-slices, P-slices, and B-slices. Although some H.264 bitstreams may include frames that are divided into two or more slices, other H.264 bitstreams may represent each frame as one slice.

Some compression formats may define profiles in order to further restrict the encoding techniques permitted in encoding a source video. For instance, the H.264 format includes the profiles "Baseline," "Main," and "High," among others. The "Main" and "High" profiles support encoding source frames into I-slices, P-slices, or B-slices, but the "Baseline" profile supports only encoding source frames into I-slices or P-slices. The computing system may receive data indicating a particular profile under which to encode the source video. In some cases, receiving the indication of the compression format may involve receiving data indicating a particular profile.

According to some compression formats, an encoder may divide a sequence of source frames into segments known as "groups of pictures" (GOP). A GOP structure may specify the order in which intra-coded pictures (i.e., I-frames) and inter-coded pictures (i.e., P- and B-frames) are arranged within the bitstream. For instance, in some encoding formats, such as MPEG-2, each GOP begins with an I-frame. The I-frame is followed in the GOP by one or more P- or B-frames. Under H.264, the GOP structure is known as a coded video sequence.

Figure 4:
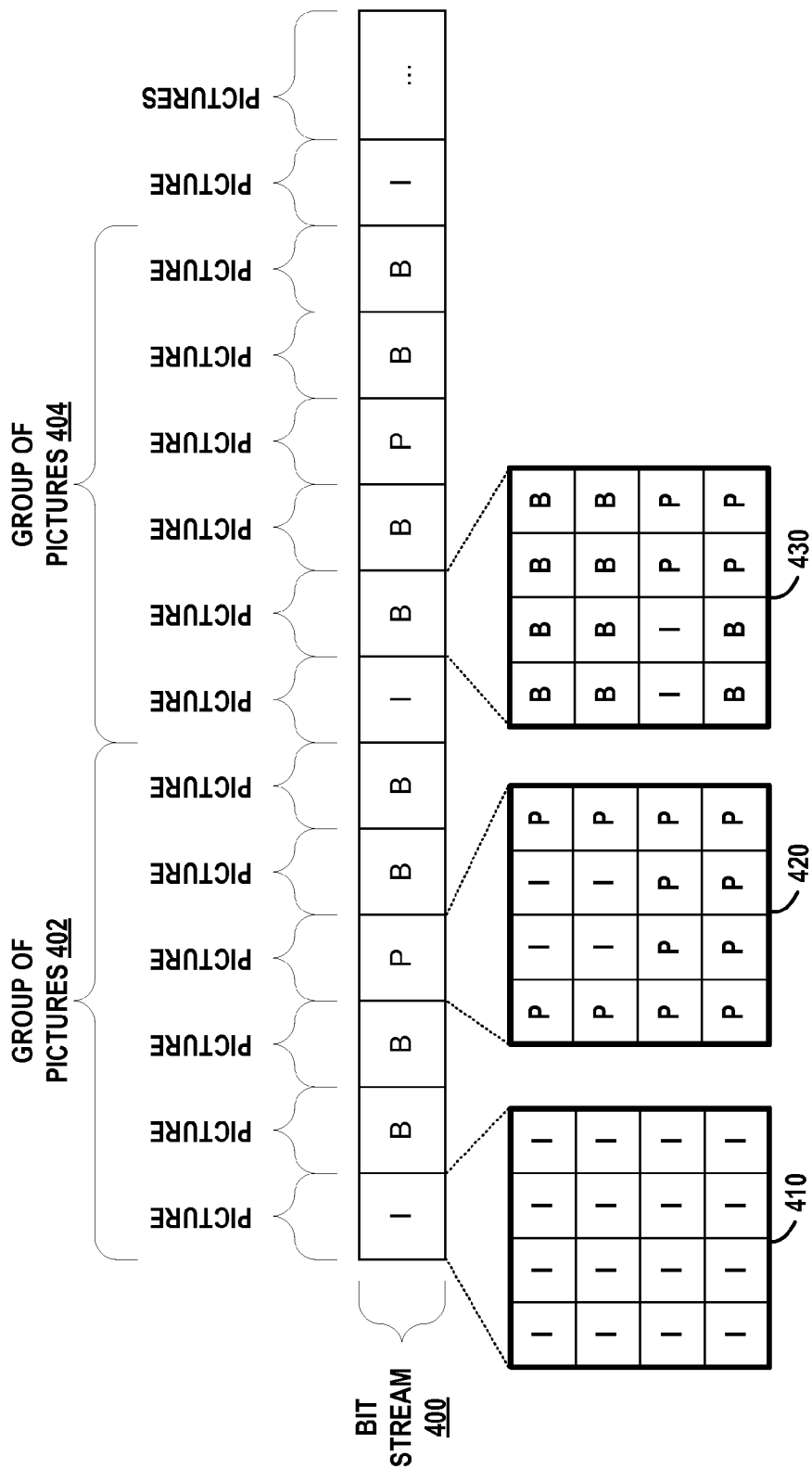
FIG. 4 illustrates an example bitstream that might conform to an example compression format.

FIG. 4 shows an example bitstream 400 that includes a sequence of pictures (perhaps representing respective source frames). The sequence of pictures is divided into groups of pictures including representative groups of pictures 402 and 404. Each group of pictures includes an I-frame, followed by two B-frames, a P-frame, and two additional B-frames, as shown. In some cases, the sequence of I-, P-, and B-frames may repeat in successive groups of pictures. The GOP structure is sometimes referred by two numbers, for example, M=3, N=6. The first number (M) indicates the number of frames between two I- or P-frames in the sequence. The second number (N) indicates the number of frames between two I-frames. The second number indicates the GOP size and the key-frame interval of a bitstream. Some compression formats permit flexibility in the number of pictures in group of pictures. For example, an encoder may start a new group of pictures at a new scene in the source video, which may result in the group of pictures that precedes the new group of pictures including fewer pictures than some other groups of pictures (e.g., fewer pictures than the GOP size).

In some example compression formats, pictures (frames) may be sub-divided into processing units. Each processing unit may include samples that represent a portion of a source frame. For instance, processing units of an example compression format may include respective 16×16 arrays of samples. Under MPEG-2, pictures may be sub-divided into units known as macroblocks. Under H.264, slices may be sub-divided into macroblocks. Other examples of processing units include coding tree units in the H.265 codec, megablocks in the VP8/9 codecs. The terms "macroblock" and "processing unit" are used in this disclosure to refer to H.264 macroblocks, as well as macroblocks in other MPEG codecs, coding tree units in the H.265 codec, megablocks in the VP8/9 codecs, and any other similar or equivalent part of a picture or frame in any codec.

Processing units may be coded into different prediction types on a per-unit basis. For instance, an encoder may encode processing units of a frame or slice as intra-coded units, predictive-coded units, and/or bi-predictive coded units, depending on the type of picture or slice. For instance, P-frames may include intra-coded units or predictive-coded units. B-frames may include intra-coded units, predictive-coded units, or bi-predictive coded units. I-frames may include only intra-coded units, as an I-frame that included P- or B-type processing units would not be intra-coded.

FIG. 4 further shows how a I-frame, a P-frame, and a B-frame might be sub-divided into processing units. As shown, an I-frame might be divided into an array 410 of intra-coded units. A P-frame, might be divided into an array 420 that includes predictive-coded or intra-coded units. A B-frame might be divided into an array 430 that includes predictive-coded, intra-coded units, or bi-predictive units, as shown. The arrangement and number of I- and/or P-units (or I-, P-, and/or B-units) may vary from frame to frame, depending on the content of the source frame represented.

Figure 5:
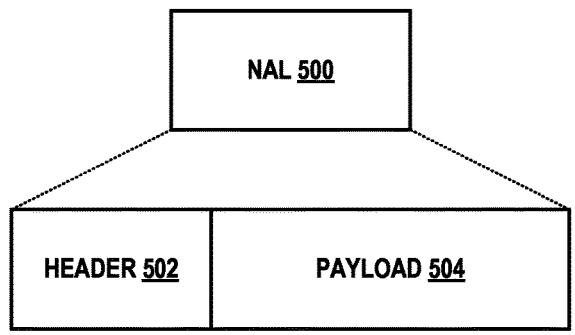
FIG. 5 illustrates example components of an example video bitstream.

In another aspect, the compression format may define a data structure of the bitstream. For instance, the H.264 bitstream is divided into packets known as Network Abstraction Layer (NAL)-packets. Other codecs may also format bitstreams into packets, or may use alternate data units. FIG. 5 illustrates an example NAL packet 500. As shown, the NAL packet 500 is divided into a header 502 and a payload 506. The header 502 may indicate the type of the packet. Types of NAL packets may include frame data (e.g., data representing pixels of a source frame) or header data (e.g., data describing the bitstream), among others. Decoders that support H.264 may be configured to interpret NAL packets in decoding an H.264 bitstream.

Figure 6:
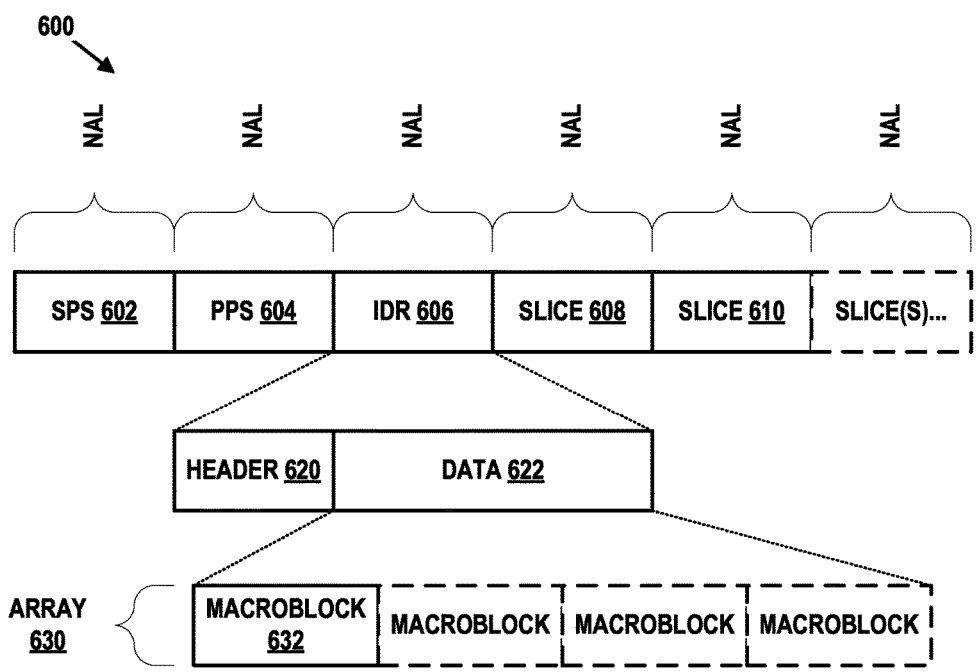
FIG. 6 illustrates example sub-components or sub-portions of the example video bitstream.

FIG. 6 illustrates an example H.264 bitstream 600 that includes a sequence of NAL-packets of different types. Some of the NAL-packets are headers that include data describing the bitstream or segments into which the bitstream is sub-divided. Bitstream 600 includes two types of headers: a Sequence Parameter Set (SPS) 602 and a Picture Parameter Set (PPS) 604. Other NAL-packets include data that represents a source frame or perhaps a portion of a source frame, depending on the compression format. Examples of these packets include representative instantaneous decoding refresh (IDR) packet 604 and representative slice data packets 608 and 610.

The Sequence Parameter Set 602 packet contains information referring to a sequence of NAL packets. The SPS 602 may indicate various information about a sequence, such as the height and width of frames represented by the sequence. The Picture Parameter Set (PPS) 604 may contain information describing a coded picture. As noted above, a coded picture may include one or more slices.

Bitstream 606 also includes instantaneous decoding refresh (IDR) packet 606. Like other NAL packets, IDR packet 606 may include a slice header and data. IDR data packet 606 is shown by way of example as including a header 620 and data 622. Data 222 of IDR packet includes data that represents an intra-coded slice. Data 622 is further divided into a macroblock array 630. The macroblock array 630 includes at least one macroblock 632, but may include a plurality of macroblocks, as shown. As the data of the packet represents an intra-coded slice, the macroblocks of array 630 may be intra-coded as well. In H.264, an IDR packet may begin a coded video sequence, which may be considered a type of GOP structure, as noted above.

Referring back to the representative slice data packets 608 and 610, each slice data packet, like other NAL packets, may include a header and data. The data portion of each slice data packet may include data that represents a predictive-coded or bi-predictive coded slice, among other examples. The data of each slice packet may be further divided into a macroblock array (not shown), which may include one or more macroblocks. The macroblocks may be encoded as intra-coded macroblocks, predictive-coded macroblocks, or bi-predictive macroblocks, depending on the predictive coding of the slice.

In the H.264 compression format, the slice header contains information about the slice. For instance, the slice header may indicate the address of the first macroblock in the slice, among other parameters. Under H.264, macroblocks in a frame are addressed in raster scan order (i.e., left-to-right, top-to-bottom). Other codecs may address component parts of frames in different ways, all of which are contemplated herein. The slice header may also indicate which slice of a frame that the packet belongs to, such as the first slice or the second slice. The header may further indicate the type of slice (e.g., intra-coded or predictive-coded). During decoding, a decoder may determine how to interpret the slice based on the header.

While, as noted above, a compression format may define various aspects of encoded video, a compression format might not define other aspects. For instance, a compression format might not define encoding algorithms. Accordingly, different encoders may produce different bitstreams from the same source video. These different video streams may all be decodable by a decoder that supports decoding the compression format, so long as the bitstream complies with aspects defined by the standard. Some encoders may operate according to one or more settings that influence the bitstream that is ultimately produced by the encoder. Such settings may include the GOP size, the key-frame interval, the number of reference frames in each GOP, and when to encode an intra- or inter-coded picture (or processing unit). The computing system may receive data indicating particular settings under which to encode the source video. In some cases, receiving the indication of the compression format may involve receive data indicating the settings to use with the compression format.

As described above, the term "compression format" may refer both to particular compression formats that may be targeted by an encoder in encoding a source video, as well as any profiles or settings that influence how an encoder encodes a source video into a bitstream that is compliant to a particular compression format.

Referring back to FIG. 3, at block 306, the method involves encoding the source frames. For instance, encoder 212 of FIG. 2 may encode the source frames of the received source video. Alternatively, encoder 216 may encode the source frames of the received source video. In some cases, multiple encoders may encode the source frames. Such encoders may be included in a single computing system, or divided among multiple computing systems, such in a server cluster.

In one aspect, an encoder may encode the sequence of source frames as a sequence of predictive-coded pictures that conform to the compression format. As noted above, combining frames of different types in a single output frame can make the frame undecodable by standard decoders, perhaps because such decoders might not be able to interpret the structure of such an output frame. Encoding the sequence using predictive-coded pictures may facilitate combining the encoded frames of the source video with encoded frames of other source videos that have also been encoded as predictive-coded pictures, perhaps according to an example technique disclosed herein.

In some implementations, the encoder may divide the sequence of predictive-coded pictures into groups of pictures (i.e., segments). Each segment may include a first predictive-coded picture that is followed in the segment by one or more second predictive-coded pictures. The first predictive-coded picture and the one or more second predictive-coded pictures may be sub-divided into processing units (e.g., macroblocks).

The first predictive-coded pictures may be sub-divided into intra-coded processing units. As indicated above, intra-coded units represent respective portions of a source frame by describing the pixels of the portion. Such coding is similar to that of a I-frame, but for a portion of a picture or frame. As noted above, according to some compression formats, predictive-coded pictures may include a mixture of intra-coded units and predictive-coded units. However, by coding the predictive-coded pictures using only intra-coded units, the first predictive-coded pictures may simulate intra-coded pictures (I-frames). Such frames may appear to a decoder as predictive-coded frames so as to facilitate combination with other predictive-coded frames, but operate in at least some aspects as intra-coded frames.

An encoder may choose to encode certain source frames within the sequence as intra-coded pictures. For instance, the encoder may encode source frames that begin new scenes in the source video as intra-coded frames. The pixels of a source frame that begins a new scene might not share much data in common with pixels of preceding frames in the sequence such that coding that source frame as a predictive-coded picture relatively inefficient. In such cases, the encoder may choose to encode as intra-coded frame. As an example, the computing system may determine which source frames have pixels that differ from a preceding source frame in the sequence of source frames by more than a threshold so as to indicate a new scene in the source video. Instead of encoding these source frames as intra-coded pictures, the computing system may encode the determined source frames as respective predictive-coded pictures that are sub-divided into intra-coded units so as to simulate intra-coded pictures.

The computing system may choose to encode certain source frames within the sequence as intra-coded pictures on the basis of one or more settings. As noted above, one or more settings may be included with the compression format so as to alter the bitstream produced by the encoder in encoding the source video. Such settings may include a key-frame interval. The encoder may determine which source frames are to be encoded as intra-coded pictures on the basis of being separated in the source video by a number of source frames that is proportional to a key-frame interval of the compression profile. Instead of encoding these frames as intra-coded pictures, the computing system may encode the determined source frames as respective predictive-coded pictures that are sub-divided into intra-coded units so as to simulate intra-coded pictures.

The second predictive-coded pictures may be sub-divided into intra-coded processing units or predictive-coded processing units, so as to operate as typical predictive-coded pictures. An encoder may choose to encode certain source frames within the sequence as predictive-coded pictures. The source frames that are chosen to be encoded as predictive-coded pictures may depend on the GOP structure. As noted above, the GOP structure may depend on two numbers: M, the number of frames between two I- or P-frames, and N, the key-frame interval. As noted above, the encoder may choose to encode an intra-coded picture every n-th source frame according to the key-frame interval (or as in this example method, a predictive-coded picture that simulate intra-coded pictures). The encoder may choose to encode predictive-coded frames based on the M number. For instance, referring back to the example bitstream 400 in FIG. 4, the encoder may choose to encode a predictive-coded picture every six frames.

In some cases, a compression format may support encoding source frames as bi-predictive pictures (B-frames). An encoder may choose to encode certain source frames within the sequence as bi-predictive pictures. For instance, the encoder may choose to encode predictive-coded frames based on the M number. Referring back to the example bitstream 400 in FIG. 4, the encoder may choose to encode a bi-predictive picture in-between I- and P-frames. According to the example method, such bi-predictive pictures may be encoded as respective predictive-coded pictures such that all of the source frames are encoded as predictive-coded pictures.

Figure 7:
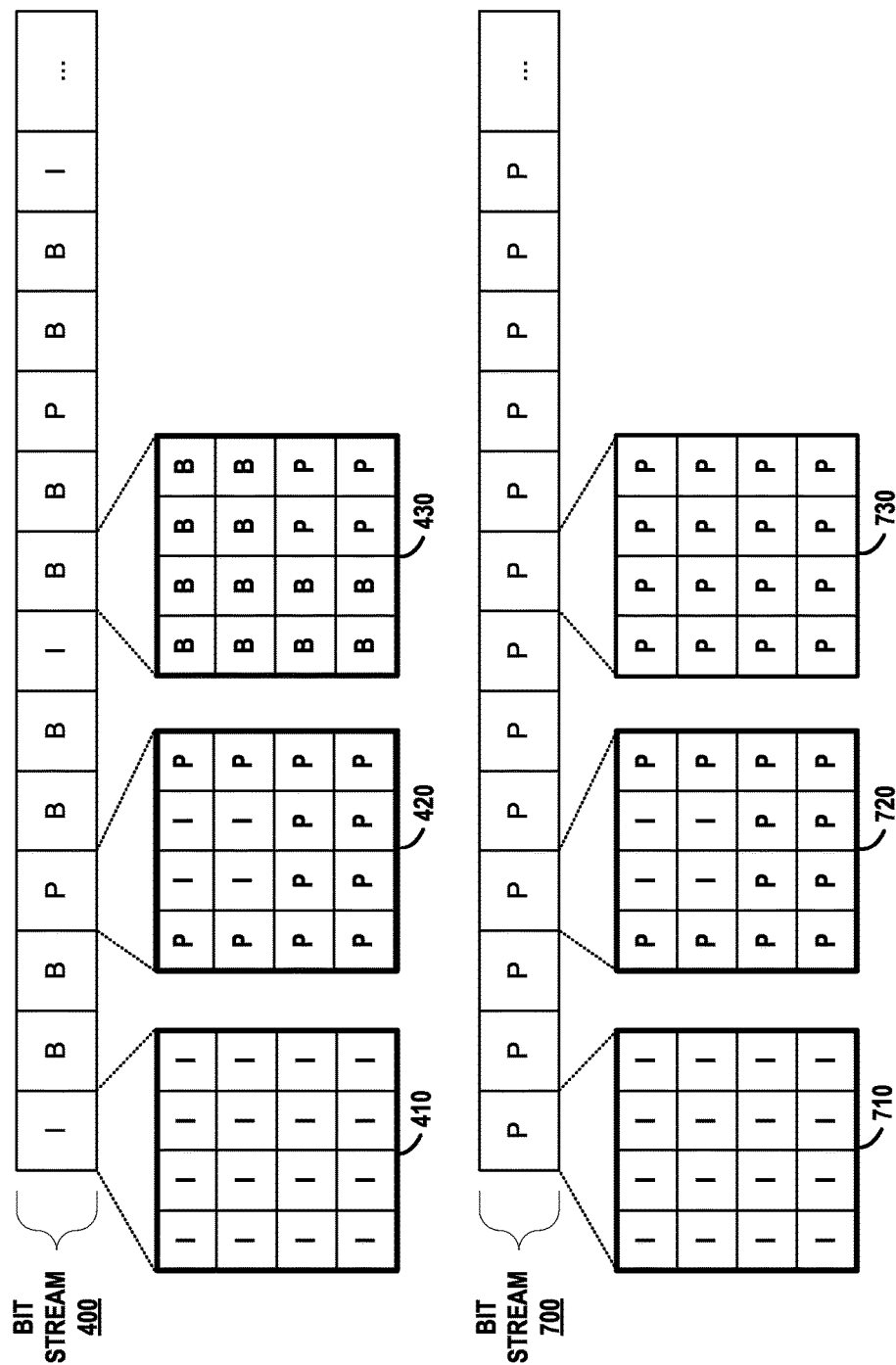
FIG. 7 illustrates the example bitstream that might conform to an example compression format and an example bitstream that might be produced according to an example method.

FIG. 7 shows an example bitstream 400 of FIG. 4, which has been encoded as a sequence of I-, P-, and B-frames, as indicated above. FIG. 7 shows an example bitstream 700 that has been encoded as a sequence of P-frames (pictures) according to the example operations noted above. Rather than encoding a source frame as an I-frame, a computing system may instead encode the source frame as a P-frame of intra-coded units, so as to stimulate the I-frame. Bitstream 700 includes an example P-frame that is divided into an array 710 of intra-coded units. P-frames of bitstream 700 might be encoded in a similar manner as in bitstream 400. However, frames that might have been encoded as B-frames are instead encoded as P-frames.

Some decoders may expect a bitstream to begin with an I-frame, as the first frame in a bitstream has no preceding frames on which to base a prediction. Therefore, in some cases, a decoder might not be able to interpret a bitstream that begins with a predictive-coded frame of intra-coded units that simulate an I-frame. The computing system may prepare a reference frame with which to begin the bitstream. For instance, the computing system may encode a reference frame as an intra-coded picture (that is sub-divided into intra-coded units). The reference frame might have one or more similar qualities as the source frames, such as the same size or configuration such that an encoded reference frame is consistent with the encoded source frames. In some cases, the reference frame may represent a blank still image (e.g., an image that includes pixels of substantially the same color so as to appear as a blank frame). Such a frame might not be distracting during playback and perhaps appear as if the video had not yet started playing.

In some cases, the computing system may encode one or more additional frames as predictive-coded pictures. Ultimately, these frames might be part of a setoff in the bitstream between the intra-coded picture (representing the reference frame) and the source frames. Such a set-off may have various applications when combining two or more bitstreams. For instance, two or more bitstreams having set-offs with different numbers of predictive-coded frames might be offset from one another in a combined bitstream. In some cases, the one or more additional frames may represent blank still images. Alternatively, the computing system may encode the the one or more additional frames as one or more predictive-coded pictures that are sub-divided into predictive-skip units. A predictive-skip unit represents a portion of a frame that is represented by a preceding picture by reference to a unit of the preceding picture. Alternatively, the frame might be discarded (i.e., not displayed or not decoded), perhaps based on a flag or other indication sent to the decoder.

Referring back to FIG. 3, at block 308, the method involves concatenating the encoded frames. In one aspect, the computing system may concatenate the first predictive-coded pictures and the second predictive-coded pictures into a sequence of predictive-coded pictures representing the source video. In another aspect, the computing system may concatenate the sequence of predictive-coded pictures representing the source frames in sequence into a bitstream after the intra-coded picture so as to begin the bitstream with the intra-coded picture representing the reference frame. In a further aspect, the computing system may concatenate the one or more predictive-coded pictures into the bitstream after the intra-coded picture so as to create a setoff of one or more predictive-coded pictures before the sequence of predictive-coded pictures representing the source frames.

Figure 8:
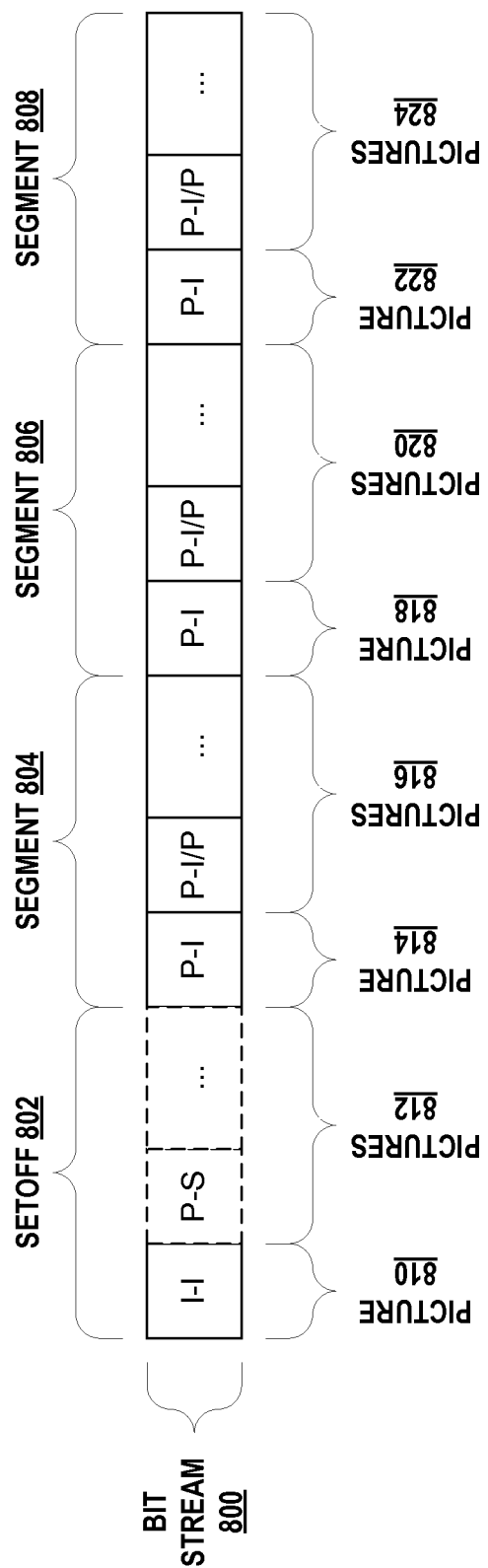
FIG. 8 illustrates another example bitstream that might be produced according to an example method.

FIG. 8 represents an example bitstream 800 that has been prepared according to the example method. Bitstream 800 includes several groups of pictures including a setoff 802 and segments 804, 806, and 808.

Setoff 802 includes picture 810 and pictures 812. Picture 810 is an intra-coded picture that is divided into intra-coded units. Pictures 812 include one or more predictive-coded pictures that are divided into respective predictive-skip units.

Segments 804, 806, and 808 include predictive-coded pictures that represent source frames individually and represent the source video in combination. Segment 804 includes picture 814 and pictures 816. Picture 814 is a predictive-coded picture (P) that has been sub-divided into intra-coded units (I) such that the picture 814 simulates intra-coded picture. Pictures 816 are predictive-coded pictures (P) that have been sub-divided into respective intra-coded units and/or predictive-coded units (I/P). Segment 806 and 808 include picture 818 and pictures 820, and picture 822 and pictures 824, respectively. Picture 818 and 822 are predictive-coded pictures (P) that have been sub-divided into respective intra-coded units (I) such that the pictures simulate respective intra-coded pictures. Pictures 820 and 824 are predictive-coded pictures (P) that have been sub-divided into respective intra-coded units and/or predictive-coded units (I/P).

Figure 9:
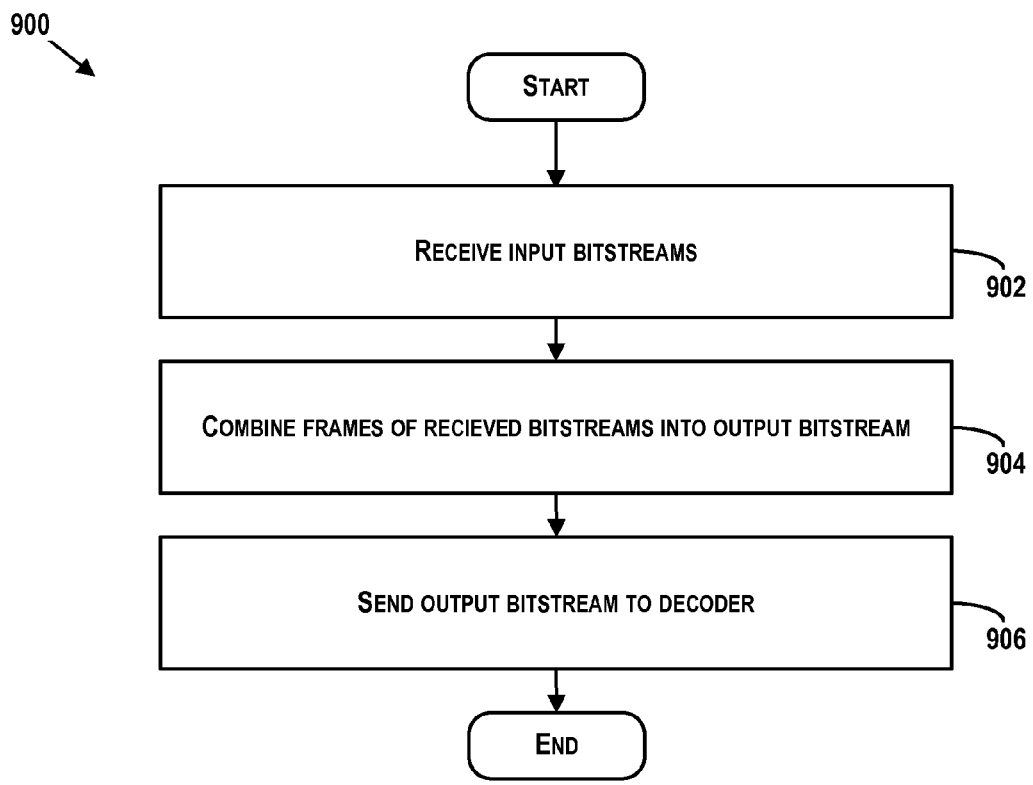
FIG. 9 illustrates an example method for combining bitstreams representing respective videos into an output bitstream.

FIG. 9 is a block diagram of an example method 900 to combine multiple compressed videos into a single compressed video that can be decoded by a single decoder, in accordance with at least some embodiments described herein. Method 900 shown in FIG. 9 presents an embodiment of a method that, for example, could be used with a computing system, such as computing system 100 in FIG. 1 or computing system 200 in FIG. 2, among other examples. Method 900 may include one or more operations, functions, or actions as illustrated by one or more blocks of 902-906. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation. Functions of the method 900 may be fully performed by a processor of a computing system, or may be distributed across multiple components of a computing system. In some examples, the functions of method 900 may be distributed across multiple computing systems and/or a server.

At block 902, the method 900 involves receiving bitstreams. For instance, a computing system may receive two or more bitstreams that have been prepared according to the example method disclosed above. For instance, the computing system may receive a first bitstream that includes, in sequence, a first setoff comprising an intra-coded frame followed by an offset of predictive-coded frames and a first sequence of frames that represents a first video. The computing system may also receive a second bitstream that includes, in sequence, a second setoff comprising an intra-coded frame and a second sequence of frames that represents a second video. The first sequence and the second sequence may be divided into respective groups of frames that include a first predictive-coded frame followed by one or more second predictive-coded frames. The first predictive-coded frames may be sub-divided into intra-coded units to simulate intra-coded frames.

In some cases, the one or more processor(s) 206 of system 200 in FIG. 2 may receive the first bitstream and the second bitstream. In some examples, the one or more processor(s) 206 may receive the first bitstream and the second bitstream from another computing system by way of interface 202 and communication link 210, for example. In other examples, the one or more processor(s) 206 may receive the first bitstream and the second bitstream from data storage 210 via communication link 210. Computing system 200 may temporarily store (i.e., buffer) the first bitstream and the second bitstream in data storage 204 when the first first bitstream and the second bitstream are received via interface 202. Alternatively, computing system 200 may store the first bitstream and the second bitstream as video files in data storage 204. Other examples are possible as well.

Figure 10:
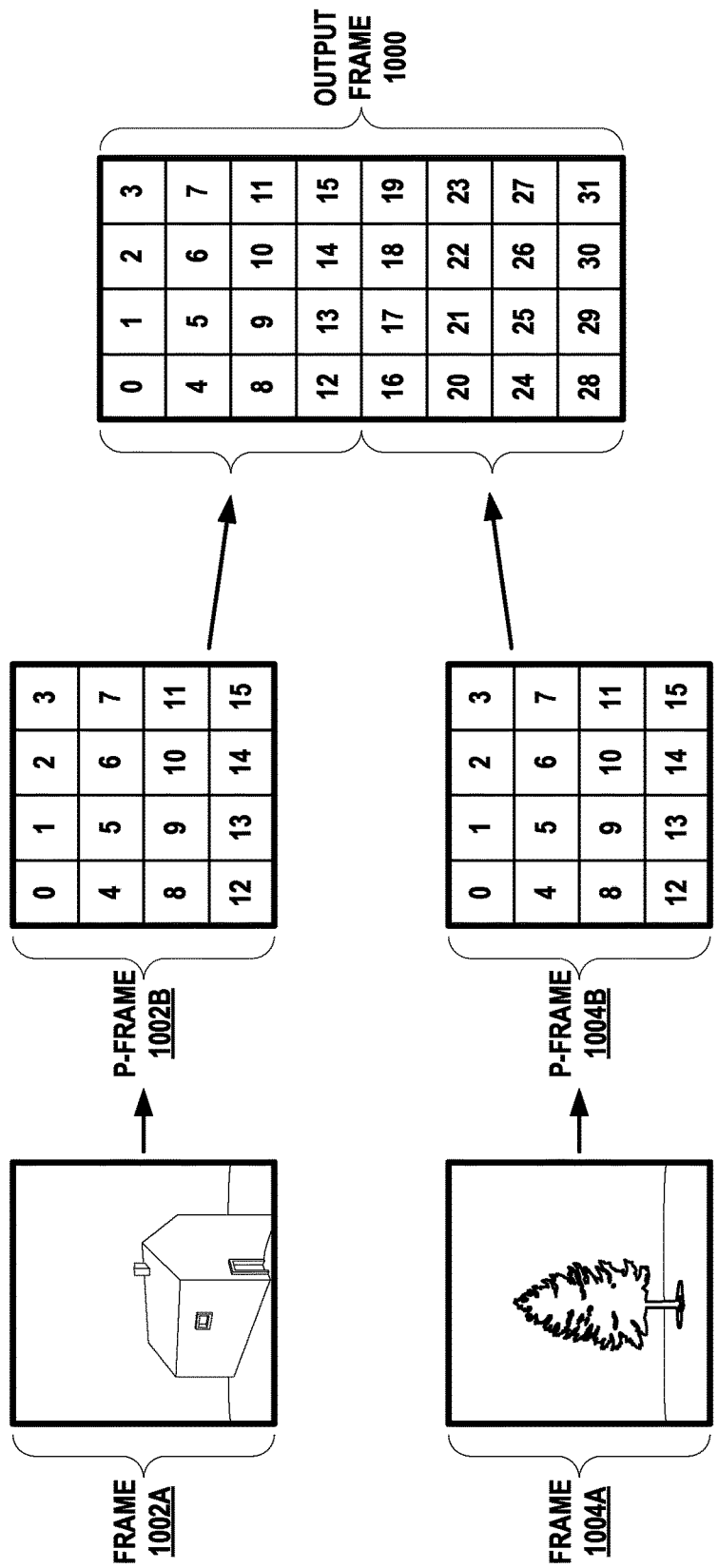
FIG. 10A illustrates example frames of video bitstreams.
FIG. 10B illustrates example P-frames of the video bitstreams.
FIG. 10C illustrates an example frame of a combined video bitstream.

FIG. 10A illustrates example frames 1002A and 1004A, which are example frames of the first video and the second video, respectively. All of the content of frames 1002A and 1004A are represented as one respective predictive-coded picture (P-frame). FIG. 10B illustrates example P-frames 1002B and 1004B, which represent example frames 1002A and 1004A, respectively. Example P-frames 1002B and 1004B are each divided into 16 macroblocks addressed from 0-15 in raster scan order. In some cases, the macroblocks may be intra-coded so as to simulate an I-frame. In other cases, the P-frames may include intra-coded and/or predictive-coded macroblocks.

While FIG. 10B shows the macroblocks of P-frames 1002B and 1004B in raster scan order, in the bitstream, the macroblocks of each slice may be sequential elements of a macroblock array, as exemplified by array 430 of FIG. 6. By referencing data in the header, such as the height and width of the picture and the address of the first macroblock in the picture, a decoder can arrange a sequence of macroblocks into a frame. For instance, P-frame 1002B has a height of 4 macro blocks, a width of 4 macroblocks, and the first macroblock in the picture is at address 0. Therefore, under raster scan ordering (left-to-right, top-to-bottom), the first macroblock of P-frame 1002B is at address 0 in the top-left corner of the frame, as shown in FIG. 10B. Since the width of the slice is 4 macroblocks, the first row includes the first four macroblocks of the frame, addressed at macroblock 1, 2, and 3, respectively, as shown. The second row includes the next four macroblocks, the third row includes the next four macroblocks after those, and the fourth row includes the last four macroblocks, also as shown. As noted above, the height of the slice is 4 macroblocks, and, accordingly, there are four rows of macroblocks in the array.

Referring back to FIG. 9, at block 904, the method 900 involves combining the received first bitstream and the received second bitstream into an output bitstream. The output bitstream may be configured to represent encoded output frames. The computing system may combine a picture from the first bitstream and a picture from the second bitstream into an encoded output frame. FIG. 10C illustrates an example output frame 1000. The processor may combine a picture from the first bitstream (e.g., P-frame 1002B) and a picture from the second bitstream (e.g., P-frame 1004B) into encoded output frame 1000.

Figure 11:
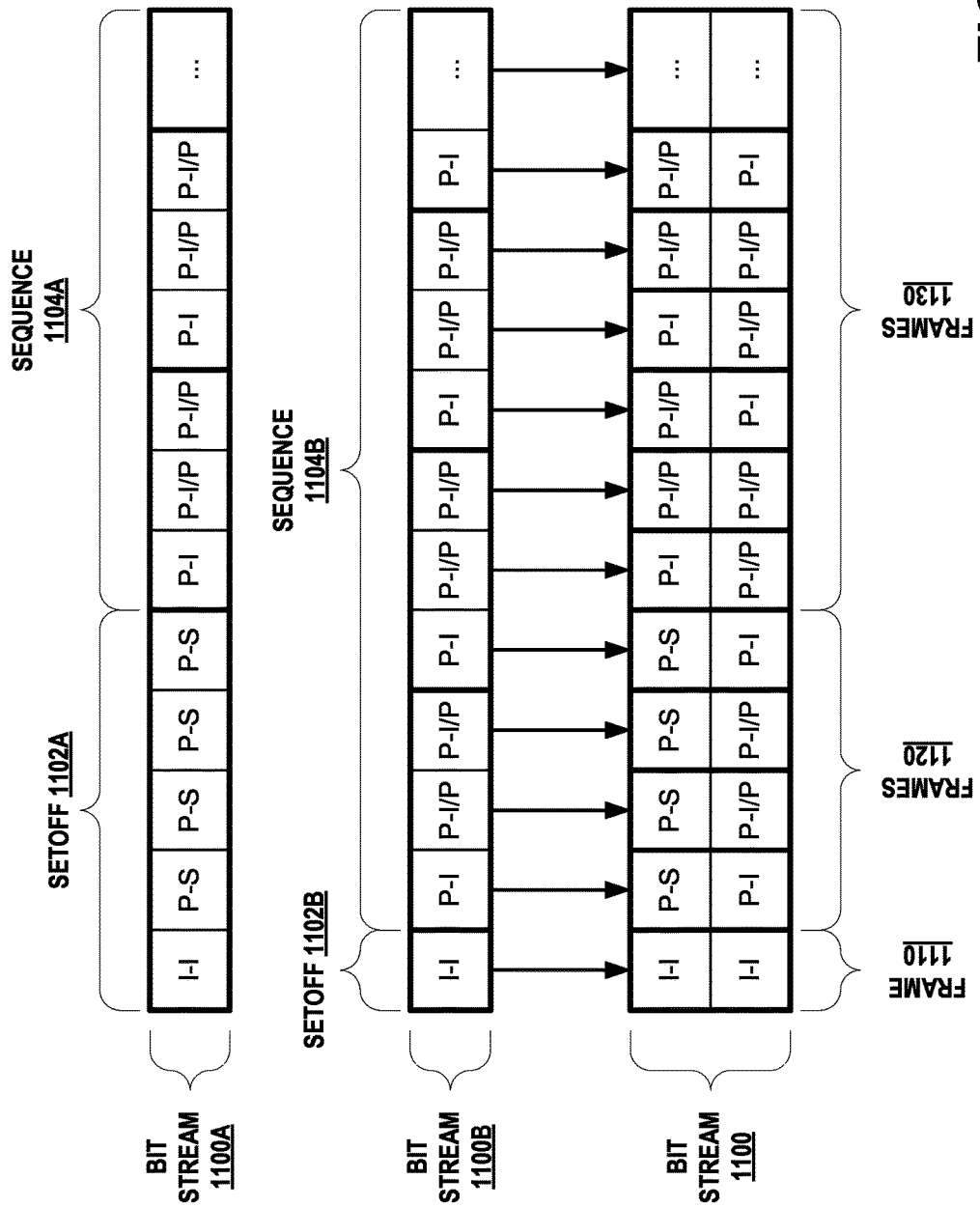
FIG. 11 illustrates example bitstreams and a combined stream representing the example bitstreams.

FIG. 11 shows example bitstreams 1100A and 1100B. Bitstreams 1100A and 1100B may represent the bitstreams received in connection with block 902.

Bitstream 1100A includes a setoff 1102A that includes an intra-coded frame which is divided into intra-coded units (I-I). The intra-coded frame is followed by an offset of predictive-coded frames which are divided into respective predictive-skip units (P-S). Bitstream 1100A also includes a sequence 1104A of frames that represents a first video. Sequence 1104A is divided into groups that include a first predictive-coded frame followed by one or more second predictive-coded frames. The first predictive-coded frame is divided into intra-coded units so as to simulate an intra-coded frame (P-I). The one or more predictive-coded frames are divided into intra-coded and/or predictive-coded units (P-I/P).

Bitstream 1100B includes a setoff 1102B that includes an intra-coded frame which is divided into intra-coded units (I-I). Bitstream 1100B also includes a sequence 1104B of frames that represents a second video. Sequence 1104B is divided into groups that include a first predictive-coded frame followed by one or more second predictive-coded frames. The first predictive-coded frame is divided into intra-coded units so as to simulate an intra-coded frame (P-I). The one or more predictive-coded frames are divided into intra-coded and/or predictive-coded units (P-I/P).

In one aspect, combining the first bitstream and the second bitstream may involve combining the intra-coded frame of the first setoff with the intra-coded frame of the second setoff as a first output frame in a bitstream of output frames. Such an operation may align the intra-coded frames in each bitstream in the first output frame. By this operation, the first output frame includes frames of the same type (I-frames). As shown in FIG. 11, the intra-coded frame of setoff 1102A is combined with the intra-coded frame of setoff 1102B as frame 1110 of bitstream 1100.

In another aspect, combining the first bitstream and the second bitstream may involve combining one or more of the predictive-coded frames of the first setoff with respective predictive-coded frames of the second sequence of frames as second output frames that follow the first frame in the bitstream of output frames such that the one or more predictive-coded frames of the first setoff delay the first sequence of frames relative to the second sequence of frames within the bitstream. As shown in FIG. 11, the predictive-coded frames of setoff 1102A are combined with the predictive-coded frames of sequence 1104B as frames 1120 of bitstream 1100.

Such a combination creates an offset between sequence 1104A and sequence 1104B in bitstream 1100. However, the offset might not cause issues with decoding bitstream 1100 since frames of the same prediction type are aligned in respective output frames. The number of predictive-coded frames in a setoff may vary so as to provide flexibility in the amount of delay between the first video and the second video. This allows the playback of the first video and the second video to start at respective arbitrary times.

In a further aspect, combining the first bitstream and the second bitstream may involve combining, in sequence, the predictive-coded frames of the first sequence of frames with respective predictive-coded frames of the second sequence of frames as third output frames that follow the second output frames in the bitstream of output frames. As shown in FIG. 11, the predictive-coded frames of sequence 1102A are combined with the predictive-coded frames of sequence 1104B as frames 1130 of bitstream 1100.

The computing system may combine frames from the received bitstreams into different arrangements. In some embodiments, the processor may arrange the frames from the received bitstreams into a vertical stack. For example, P-frame 1002B of FIG. 5B is vertically stacked onto P-frame 1004B in output frame 1000. In other embodiments, the processor may arrange the frames from the received bitstreams into a grid.

For decoding by particular decoders, the processor may configure the frames of the received bitstreams into different arrangements. For instance, some decoders may support decoding frames that are no wider than a maximum frame width. Further, the maximum frame width supported by some decoders may be relatively narrow, such that some horizontal arrangements of frames may exceed the maximum frame width. To arrange frames from the received bitstreams for such decoders, the frames may be vertically stacked upon one another, creating a relatively tall and narrow frame. Some decoders decode in raster-scan order (i.e., row-by-row) such that a relatively tall and narrow frame may decode more efficiently than a wider frame. FIG. 12 illustrates an example frame 1200 that includes P-frames 1202, 1204, 1206, and 1208 in a vertically stacked configuration.

Figure 13:
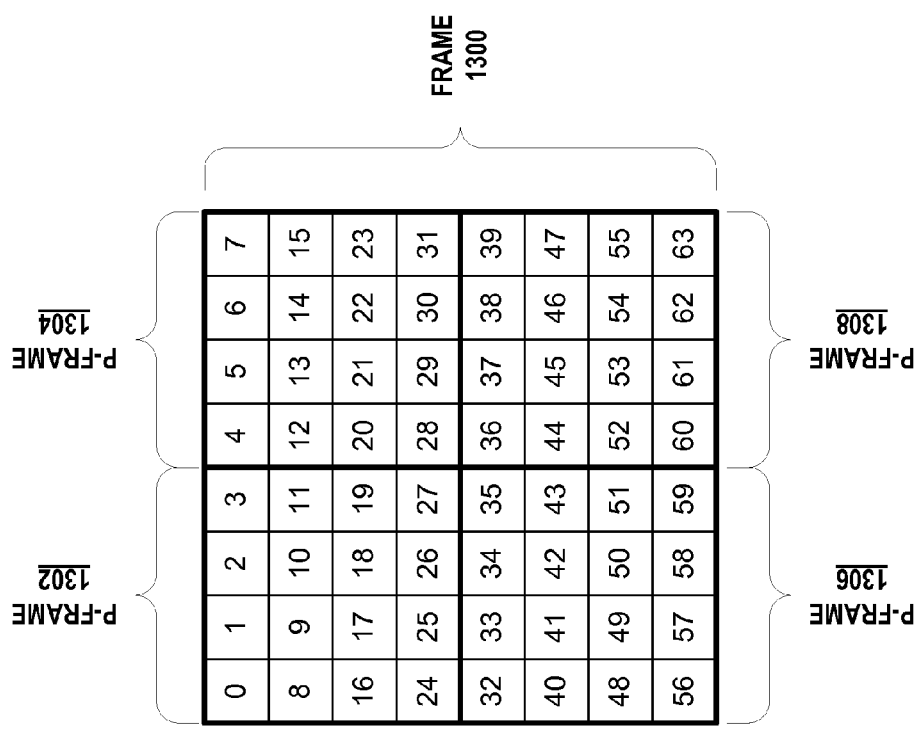
FIG. 13 illustrates an example frame of yet another combined video bitstream.

Further, some decoders may support decoding frames up to relatively narrow maximum frame height, which may be exceeded when a certain number of frames are vertically stacked. In such a circumstance, the processor may arrange the frames into a grid. FIG. 13 illustrates an example frame 1300 in which P-frames 1302, 1304, 1306, and 1308 are arranged into a rectangular grid.

The processor may combine the first bitstream and the second bitstream into the output bitstream using a variety of techniques. For example, the processor may decode the bitstreams, combine the decoded videos into an output video, and then encode the output video into the output bitstream. Alternatively, the processor may combine the first bitstream and the second bitstream into the output bitstream without fully decoding the first bitstream and the second bitstream. For instance, the processor may generate the output bitstream and arrange the encoded frames within the output stream. Alternatively, the processor may modify the first bitstream to include the second bitstream. Other examples are possible as well.

As noted above, in some embodiments, a decoder may decode the first bitstream and the second bitstream before the processor combines frames of the first bitstream with frames of the second bitstream. For example, an application executing on a mobile computing system, such as a smartphone or tablet computer, may request the first video and the second video from a server that is accessible over a network, such as the Internet. The server may then send the first video and the second video, as a first bitstream and a second bitstream, respectively, to an intermediate computing system (e.g., a server) having one or more video encoder/decoders and at least one processor. The one or more one or more video encoder/decoders may decode the first bitstream and the second bitstream into the first and second video. The processor of the intermediate computing system may then combine the frames of the first video with frames of the second video into an output video. The one or more one or more video encoder/decoders may then encode the output video into the output bitstream. The intermediate computing system may then send the output bitstream to the mobile computing system, which may decode the output bitstream using its decoder.

In some embodiments, combining the received bitstream into an output bitstream may involve defining in one or more headers of each received bitstream that the frames represented by the received bitstream are component parts of the output bitstream. For instance, referring back to FIGS. 10A-C, frame 1002A of the first video may be represented by P-frame 1002B of the first bitstream. Within the first bitstream, P-frame 1002B may be a particular NAL packet of the slice data type. The slice data packet may have a header containing one or more parameters that indicate to a decoder that P-frame 1002A (and in turn, frame 1002A) is part of the first bitstream. P-frame 1004B may also have its own header indicating that P-frame 1004B (and thus frame 1004A) is part of the second bitstream. When a decoder decodes a slice data packet, the decoder may reference the one or more parameters in determining which bitstream the slice data packet is in. NAL packets of the same bitstream may each have the same indication within their respective header, which may group the packets into the same video when decoded.

One or more processors may use such parameters to combine the first bitstream and the second bitstream into the output bitstream. For each frame of the received first bitstream, the one or more processors may decode (or parse) from a header of the first bitstream, one or more parameters that indicate that the frame is a slice of the first bitstream. Then, the one or more processors may define (or re-define) the one or more parameters to indicate that the frame is a first slice of a respective output frame. And, for each frame of the received second bitstream, the one or more processors may decode one or more parameters, from a header of the second bitstream, that indicate that the frame is a second slice of the respective output frame. For instance, the one or more processors may define in a header of P-frame 1002B that P-frame 1002B is part of frame 1000 and also define in a header of P-frame 1004B that P-frame 1004B is part of frame 1000. Then, for example, when frame 1000 is decoded, the decoder will arrange the content of frame 1002A and frame 1002B as frame 1000 of the output bitstream, rather than as P-frames 1002B and 1004B of the first bitstream and second bitstream respectively. And the decoder will arranged the content of frame 1004A as slice 1004C of frame 1000 of the output bitstream.

The specific parameters in the header used to indicate that the frame is a part of an output frame may vary based on the codec used to encode the received bitstreams. In some cases, one or more parameters may explicitly define the frame as a part of an output frame. In other cases, the one or more parameters may implicitly define the frame as a part of an output frame. For instance, changing an address in a header may define the frame as a part of an output frame.

To generate the output bitstream, the one or more processors may create a header defining the output bitstream. For instance, with H.264, the one or more processors may create a SPS packet. The header of the output bitstream may indicate that the output frames are part of the output bitstream. The one or more processors may also define various parameters of the output bitstream in the header, such as the output frame height and the output frame width. Some of the parameters may be based on aspects of the first bitstream and/or the second bitstream. For instance, the one or more processors may decode (or parse) from the first bitstream and the second bitstream, a first frame height and a second frame height, which may indicate the height of frames of the first bitstream and the second bitstream, respectively. Then, when vertically stacking frames, the one or more processors may define in the header the height of the output frames as the sum of the first frame height and the second frame height. For instance, when combining slice 502*b* and 504*b* into frame 500, the one or more processors may define the frame height of the output bitstream as 8 macroblocks and the frame width as 4 macroblocks, as the two slices are each 4 macroblocks high and 4 macroblocks wide.

Alternatively, to generate the output bitstream, the one or more processors may define the first bitstream as the output stream and then concatenate frames from the other received bitstreams to the first bitstream. The one or more processors may also decode parameters from one or more headers of the first bitstream and re-define the one or more parameters as necessary. For instance, the one or more processors may parse out the frame height of the first bitstream and re-define the frame height as the sum of the frame heights of the frames of the first bitstream and the heights of the frames of each additional bitstream that is combined with the first bitstream.

To arrange a frame of the first bitstream and a frame of the second bitstream within the output frame, the one or more processors may define (or re-define) various parameters contained within one or more headers of the received bitstreams or in a header of the output bitstream. As noted above, slice headers may contain an indication of the address of the first macroblock in the slice. For instance, when combining P-frames 1002B and 1004B into frame 1000 (i.e., a vertically stacked configuration), the one or more processors may define the address of the first unit of P-frame 1004B as address 16. Address 16 is incremented, by a unit, from the address of the last unit of the first P-frame (i.e., address 15, indicating the sixteenth macroblock of output frame 1000). As another example, referring to FIG. 12, to arrange P-frames 1202, 1204, 1206, and 1208 into a vertically stacked configuration as shown, the one or more processors may define the address of the first unit of the first P-frame (P-frame 602) as 0. The one or more processors may also define addresses of the first units of P-frames 604, 606, and 608 as 16, 32, and 48, respectively. Each of these addresses is incremented by one unit from the address of the last unit of the preceding frame. By defining the position of the first unit in the frame for P-frames 604, 606, and 608 in this way, the one or more processors may vertically concatenate each unit array of each slice to the preceding array.

The one or more processors may also use such techniques in combining a respective frame of each received bitstream into an output frame having a grid layout. Consider, for example, that the one or more processors receives a first bitstream, a second bitstream, a third bitstream, and a fourth bitstream. Each received bitstream represents frames of a respective video. Frames of each video are represented in the bitstream as one four by four slice that is divided into an array of sixteen units. By way of example, P-frames 1202, 1304, 706, and 1308 of FIG. 13 may represent such slices. To arrange P-frames 1302, 1304, 1306, and 1308 into the rectangular grid arrangement of FIG. 13, the one or more processors may define the addresses of the first unit of P-frames 1302, 1304, 1306, and 1308 as address 0, address 4, address 32, and address 36, respectively. In this manner, the array of units in P-frame 1304 is horizontally-concatenated to the array of units in P-frame 1302. And, the array of units in P-frame 1306 is vertically concatenated to the array of units in P-frame 1302, and the array of units in P-frame 1308 is horizontally concatenated to the array of units in slice 1306.

The one or more processors may also define (or re-define) parameters to maintain consistency in the output stream. For instance, the one or more processors may redefine a parameter indicating a frame number. When the sequences of P-frames representing the videos are offset, the frame number of P-frames combined into the same output frame might be different. Accordingly, the one or more processors may re-define the frame numbers of the P-frames so that the P-frames in each output frame have the same frame numbers.

Referring back to FIG. 9, at block 906, the method involves sending the output bitstream to a decoder. For instance, one or more processors 206 of FIG. 2 may send the output bitstream to decoder 214 or decoder 218. Alternatively, one or more processors 206 of FIG. 2 may send the output bitstream to a decoder on another computing system, perhaps by way of interface 202.

The decoder receiving the output bitstream may decode the output bitstream into an output surface format that includes, in respective non-overlapping regions, decoded frames of the first video and decoded frames of the second video. The output surface format may, for example, represent each frame of the output bitstream as an array of pixel data. Each array of pixel data may represent a frame of the first video and a frame of the second video in a different region. The processor may then sample from the different regions to divide the output surface format into the first video and the second video.

The computing system may provide the decoded frames of the first video and the decoded frames of the second video display. For instance, one or more processors 206 may provide the decoded frames to interface 202. As noted above, interface 202 may include a screen, such as a touchscreen, which may display the decoded frames of each video when they are provided to interface 202 by the processor.

In some cases, the first video may represent a first video texture and the second source video represents a second video texture. In such cases, decoding the output bitstream may involve decoding the bitstream of output frames so as to concurrently provide in memory the first video texture and the second video texture. The one or more processors may combining the first video texture and the second video texture so as to provide one or more additional video textures in memory using the decoder. Combining the first video texture and the second video texture may involve tiling and/or blending frames of each video. By tiling or blending a videos as textures, rather than still images, the variation of the texture is increased. This may reduce any apparent repetition in the tiling. Further, as two videos or more videos are combined, the variation is further increased.

In other cases, the first video and the second video may be the same source video. As noted above, a setoff of frames may be concatenated into an encoded bitstream. When two bitstreams representing a particular source video are combined, such a setoff may offset a first sequence of frames (representing a particular source video) from a second sequence of frames (also representing the particular source video). In such cases, decoding the output bitstream may involve decoding the bitstream of output frames so as to concurrently provide a first instance of the particular source video and a second instance of the particular source video that is delayed by the one or more predictive-coded frames of the first setoff. As noted above, the amount of delay may vary by in proportion to the number of P-frames in the setoff.

In some cases, the computing system may switch playback of the second instance of the particular source video on a display to playback of the first instance of the particular source video on the display so as to cause an apparent instant skip forward in the particular source video. Such an instant skip forward is possible because the offset sequences are being decoded concurrently by a decoder.

In some cases, the computing system may receive an indication of a seek position within the particular source video (e.g., seek to 3:28:14 in the source video). The computing system may detect which frame of the first instance of the particular source video is being decoded and which frame of the second instance of the particular source video is being decoded currently. Then, the computing system may determine a frame that is nearest to the seek position from among the detected frame of the first instance of the particular source video that is being decoded, the detected frame of the second instance of the particular source video that is being decoded, or a first predictive-coded frame that is sub-divided into intra-coded units. The computing system is able to switch playback to any of these frames. The computing system is able to switch playback to the detected frame of the first instance of the particular source video and the detect frame of the second instance of the particular source video as those frames are being decoded. The computing system may also initiate decoding at any predictive-coded frame that has been coded as intra-coded units to simulate an intra-coded frame. Based on determining the nearest frame to the seek position, the computing system may initiate decoding of the bitstream of output frames at the determined frame to cause an apparent instant skip to the seek position.

In some examples, the first video and the second video may represent video previews of respective videos. For instance, a news feed application may provide for display of a video preview next to each news item. Alternatively, a video gallery application may indicate each video in the gallery using a video preview. By application of the present methods, the processor may combine the video previews into an output bitstream and then decode them together by decoding the output bitstream. This may enable various features. For instance, two or more of the video previews may play concurrently. Moreover, each video preview may start at an arbitrary time. Other applications are possible as well.

In other examples, the first video may represent a particular scene from a first viewpoint and the second video may represent the particular scene from a second viewpoint. In such an example, the computing system may, as indicated above, decode the bitstream of output frames so as to concurrently provide the first video and the second video. The computing system may also switch playback of the first video on a display to playback of the second video on the display so as to cause an apparent instant shift in viewpoint of the particular scene from the first viewpoint to the second viewpoint. Such a switch may be performed in response to the computing system detecting input, such as an input selecting the second viewpoint.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computing system comprising:
   one or more processors;
   data storage configured to store instructions, that when executed by the one or more processors, cause the computing system to:
      receive a source video comprising a sequence of source frames, wherein the source frames comprise respective pixels;
      receive data representing a compression format for encoding the source video, wherein the compression format defines at least two types of pictures including intra-coded pictures which represent respective source frames by describing the pixels of the source frame and predictive-coded pictures which represent respective source frames by describing differences between the pixels of the source frame and the pixels of one or more preceding source frames;
      encode source frames, which are designated by the compression format to be encoded as intra-coded pictures, as respective first predictive-coded pictures that are sub-divided into intra-coded units so as to simulate intra-coded pictures, wherein the intra-coded units represent respective portions of a source frame by describing the pixels of the portion;
      encode source frames that are designated by the compression format to be encoded as predictive-coded pictures as respective second predictive-coded pictures; and
      concatenate the first predictive-coded pictures and the second predictive-coded pictures into a sequence of predictive-coded pictures so as to produce a bitstream representing the source video.

2. The computing system of claim 1, wherein the source frames are a particular size, and wherein the instructions further cause the computing system to:
   encode a reference frame of the particular size as an intra-coded picture that is sub-divided into intra-coded units; and
   concatenate the sequence of predictive-coded pictures representing the source frames in sequence into the bitstream after the intra-coded picture so as to begin the bitstream with the intra-coded picture representing the reference frame.

3. The computing system of claim 2, wherein the reference frame comprises pixels of substantially the same color so as to represent a blank frame.

4. The computing system of claim 2, wherein the instructions further cause the processor to:
   encode one or more frames as one or more respective predictive-coded pictures; and
   concatenating the one or more predictive-coded pictures into the bitstream after the intra-coded picture so as to create a setoff of one or more predictive-coded pictures before the sequence of predictive-coded pictures representing the source frames, wherein the one or more predictive-coded pictures of the setoff reference the reference frame so as to represent substantially the same pixels.

5. The computing system of claim 1, wherein encoding source frames that are designated by the compression format to be encoded as intra-coded pictures as respective predictive-coded pictures comprises:
  determining source frames that are to be encoded as intra-coded pictures as the source frames are separated in the source video by a number of source frames that is proportional to a key-frame interval of the compression format; and
  encoding the determined source frames as respective predictive-coded pictures that are sub-divided into intra-coded units so as to simulate intra-coded pictures.

6. The computing system of claim 1, wherein encoding source frames that are designated by the compression format to be encoded as intra-coded pictures as respective predictive-coded pictures comprises:
  determining source frames having pixels that differ from a preceding source frame in the sequence of source frames by more than a threshold so as to indicate a new scene in the source video; and
  encoding the determined source frames as respective predictive-coded pictures that are sub-divided into intra-coded units so as to simulate intra-coded pictures.

7. The computing system of claim 1, wherein the compression format further supports encoding source frames into at least a third type of picture including bi-directional predictive pictures which represent respective source frames by describing differences between the pixels of the source frame and the pixels of one or more preceding source frames and the pixels of one or more succeeding source frames in a sequence; and
wherein the instructions further cause the computing system to:
  encode source frames that are designated by the compression format to be encoded as bi-directional predictive pictures as respective predictive-coded pictures.

8. The computing system of claim 1, wherein the predictive-coded pictures are sub-divided into one or more of: intra-coded units that represent respective portions of a source frame by describing the pixels of the portion and predictive-coded units that represent respective portions of a source frame by describing differences between the pixels of the portion of the source frame and pixels in respective portions of one or more preceding frames.

9. A method comprising:
  receiving, by one or more processors, a source video comprising a sequence of source frames, wherein the source frames comprise respective pixels;
  receiving, by the one or more processors, data representing a compression format for encoding the source video, wherein the compression format defines at least two types of pictures including intra-coded pictures which represent respective source frames by describing the pixels of the source frame and predictive-coded pictures which represent respective source frames by describing differences between the pixels of the source frame and the pixels of one or more preceding frames;
  encoding, by the one or more processors, a reference frame as an intra-coded picture that is sub-divided into intra-coded units that represent respective portions of the reference frame by describing the pixels of the portion, wherein the reference frame comprises pixels of substantially the same color;
  encoding, by the one or more processors, the sequence of source frames as a sequence of predictive-coded pictures conforming to the compression format, wherein the sequence is divided into groups of pictures that include a first predictive-coded picture followed by one or more second predictive-coded pictures, and wherein the first predictive-coded picture is sub-divided into intra-coded units that represent respective portions of a source frame by describing the pixels of the portion so as to simulate an intra-coded picture; and
  concatenating, by the one or more processors, the sequence of predictive-coded pictures after the intra-coded picture so as to produce a bitstream including the intra-coded picture followed by the sequence of predictive-coded pictures.

10. The method of claim 9, further comprising:
  encoding one or more predictive-coded pictures that are sub-divided into predictive-skip units, wherein a predictive-skip unit represents a portion of a frame that is represented by a preceding picture by reference to a unit of the preceding picture; and
  concatenating the one or more predictive-coded pictures into the bitstream after the intra-coded picture such that the predictive-skip units of the one or more predictive-coded pictures represent portions of the reference frame.

11. The method of claim 10, wherein the predictive-coded pictures are sub-divided into one or more of: intra-coded units that represent respective portions of a source frame by describing the pixels of the portion and predictive-coded units that represent respective portions of a source frame by describing differences between the pixels of the portion of the source frame and pixels in respective portions of one or more preceding frames.

12. The method of claim 9, wherein the compression format further supports encoding source frames into at least a third type of picture including bi-directional predictive pictures which represent respective source frames by describing differences between the pixels of the source frame and the pixels of one or more preceding source frames and the pixels of one or more succeeding source frames in a sequence; and wherein encoding the sequence of source frames as a sequence of predictive-coded pictures conforming to the compression format comprises:
  encoding source frames that are designated by the compression format to be encoded as bi-directional predictive pictures as respective predictive-coded pictures.

* * * * *